United States Patent
Ollila

(10) Patent No.: US 11,558,560 B2
(45) Date of Patent: Jan. 17, 2023

(54) IMAGING APPARATUSES AND OPTICAL DEVICES HAVING SPATIALLY VARIABLE FOCAL LENGTH

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/348,875

(22) Filed: Jun. 16, 2021

(65) Prior Publication Data
US 2022/0408030 A1     Dec. 22, 2022

(51) Int. Cl.
| | |
|---|---|
| H04N 5/262 | (2006.01) |
| G02B 7/04 | (2021.01) |
| G02B 26/08 | (2006.01) |
| G02B 27/00 | (2006.01) |
| G02F 1/29 | (2006.01) |
| H04N 5/232 | (2006.01) |

(52) U.S. Cl.
CPC ........... *H04N 5/2621* (2013.01); *G02B 7/04* (2013.01); *G02B 26/0825* (2013.01); *G02B 27/0068* (2013.01); *G02F 1/294* (2021.01); *H04N 5/23219* (2013.01)

(58) Field of Classification Search
CPC .... H04N 5/2621; H04N 5/23219; G02B 7/04; G02B 26/0825; G02B 27/0068; G02F 1/294
See application file for complete search history.

(56) References Cited

U.S. PATENT DOCUMENTS

| | | | | |
|---|---|---|---|---|
| 5,097,352 A | * | 3/1992 | Takahashi | G02B 27/28 349/200 |
| 9,225,893 B2 | * | 12/2015 | Hakata | G03B 13/16 |
| 10,802,374 B1 | | 10/2020 | Wang et al. | |
| 2004/0027684 A1 | | 2/2004 | Nishioka et al. | |
| 2008/0151168 A1 | | 6/2008 | Sekiguchi | |
| 2009/0268152 A1 | | 10/2009 | Chen | |
| 2013/0070339 A1 | | 3/2013 | Pretorius | |
| 2018/0103194 A1 | | 4/2018 | Tang | |

FOREIGN PATENT DOCUMENTS

| | | |
|---|---|---|
| JP | H1092003 A | 4/1998 |
| WO | 2013126042 A2 | 8/2013 |
| WO | 2018057986 A1 | 3/2018 |
| WO | 2018154139 A1 | 8/2018 |

OTHER PUBLICATIONS

European Search Report, Extended European Search Report, application No. 22173795.0, dated Nov. 11, 2022, 12 pages.

* cited by examiner

*Primary Examiner* — Ahmed A Berhan
(74) *Attorney, Agent, or Firm* — Ziegler IP Law Group, LLC

(57) ABSTRACT

An imaging apparatus including: an image sensor having a photo-sensitive surface; an optical device arranged on an optical path of light incidenting on the photo-sensitive surface, the optical device being electrically controllable to have a spatially variable focal length; and a processor configured to: generate and send a drive signal to the optical device to compensate for field curvature of optical device by adjusting focal lengths of different portions of the optical device to different extents, wherein a focal length of a first portion of the optical device is higher than a focal length of a second portion of the optical device surrounding the first portion; and control the image sensor to capture a distorted image of a real-world environment.

23 Claims, 9 Drawing Sheets

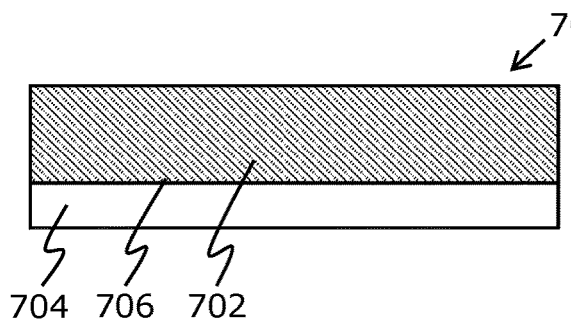
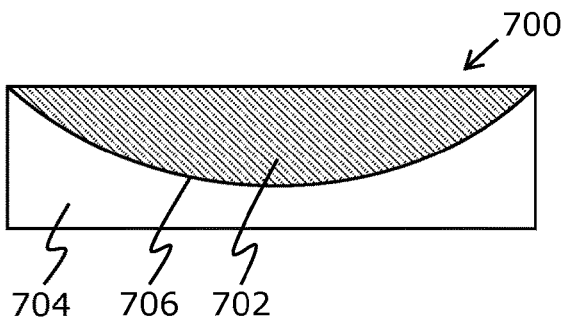
FIG. 7A  FIG. 7B
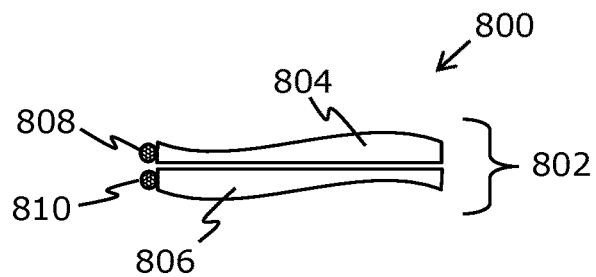
FIG. 8A
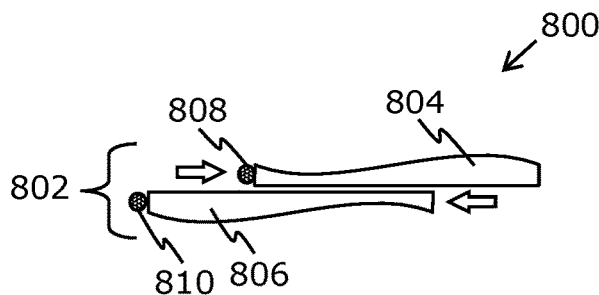
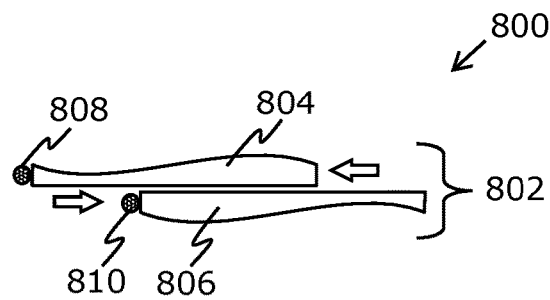
FIG. 8B  FIG. 8C
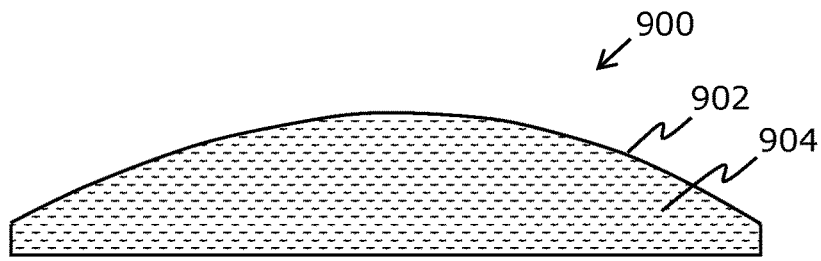
FIG. 9

IMAGING APPARATUSES AND OPTICAL DEVICES HAVING SPATIALLY VARIABLE FOCAL LENGTH

TECHNICAL FIELD

The present disclosure relates to imaging apparatuses having spatially variable focal length. Moreover, the present disclosure relates to optical devices having spatially variable focal length.

BACKGROUND

Imaging apparatuses are widely used across several industries to capture images for many applications such as extended-reality (XR) applications, entertainment, surveillance, education, and the like. Generally, imaging apparatuses employ optical devices (such as lenses, mirrors, and the like) having uniform optical properties for focusing light at an image sensor. An ideal single-element optical device is one for which all planar light wavefronts are focused on the image sensor that is arranged at a focal length distance from said optical device.

In reality, single-element optical devices do not focus light in such an ideal manner. For example, when placing a realistic single-element specialized optical device at the focal length distance from the image sensor, image points closer to an optical axis of said optical device would be in perfect focus, but image points that are off-optical axis will be focused before reaching the image sensor in a manner that they drop off by a cosine of an angle between light rays constituting such image points and the optical axis of said optical device. In other words, the realistic single-element specialized optical device forms a curved light wavefront, which is also known as field curvature.

Nowadays, specialized optical devices having variable optical properties are being developed for use in the imaging apparatuses. These specialized optical devices enable the imaging apparatuses to capture distorted images of a given environment, owing to their variable optical properties. Most conventional photographic lenses are designed to minimize field curvature, and so a given conventional photographic lens effectively has a variable focal length that increases with an increase in angular separation between a point on said lens and an optical centre of said lens that lies on an optical axis of said lens. Notably, longer focal lengths are required for obtaining high image resolution. In such a case, when a rate of image sensor readout is high (for example, such as 90 frames per second), a field of view captured in the distorted images would be very narrow, which is undesirable. Moreover, the rate of image sensor readout is limited, thus focal length change per unit image height is high. To capture a requisite field of view in the distorted images, high distortion (for example, such as 15 percent, 30 percent, 60 percent, or similar) is required to be produced by such optical devices.

However, imaging apparatuses employing such specialized optical devices have certain limitations associated therewith. Such specialized optical devices are unable to emulate human eye resolution using the distorted images (i.e., upon their un-distortion). Moreover, field curvature makes it difficult to keep an entire plane of the image sensor in focus, especially in optical devices producing high distortion and especially when there is a need to dynamically focus optical devices in new planes. For example, in a given distorted image, edge portions may be in focus and a central portion may be out of focus, which is undesirable. Furthermore, designing such specialized optical devices is quite complex as field curvature compensation is a challenging problem, especially more so when high distortion is required to be produced by optical devices and when focal length is required to vary at a high rate per unit image height as a function of the angular separation. In such cases, the problem of field curvature is much more severe and visible (i.e., perceptible) than it would be normally. Moreover, adjusting focus of the specialized optical device according to changing focusing distances (i.e., changing distances between the specialized optical device and a point of focusing in the given environment) is challenging and complex, and is presently not performed satisfactorily. The distorted images captured using such imaging apparatuses are suboptimal and find limited use.

Therefore, in light of the foregoing discussion, there exists a need to overcome the aforementioned drawbacks associated with conventional imaging apparatuses.

SUMMARY

The present disclosure seeks to provide an imaging apparatus having spatially variable focal length. The present disclosure also seeks to provide an optical device having spatially variable focal length. An aim of the present disclosure is to provide a solution that overcomes at least partially the problems encountered in prior art.

In one aspect, an embodiment of the present disclosure provides an imaging apparatus comprising:

an image sensor having a photo-sensitive surface;

an optical device arranged on an optical path of light incidenting on the photo-sensitive surface, the optical device being electrically controllable to have a spatially variable focal length; and a processor configured to:

generate and send a drive signal to the optical device to compensate for a field curvature of the optical device by adjusting focal lengths of different portions of the optical device to different extents, wherein a focal length of a first portion of the optical device is higher than a focal length of a second portion of the optical device surrounding the first portion; and control the image sensor to capture a distorted image of a real-world environment.

In another aspect, an embodiment of the present disclosure provides an optical device comprising:

at least two electrode layers;

a liquid crystal substance disposed between the at least two electrode layers; and a control circuit, coupled to the at least two electrode layers, to be employed to orient molecules of the liquid crystal substance in a given portion of the optical device in a given direction, wherein the control circuit is to be driven to adjust focal lengths of different portions of the optical device to different extents to compensate for a field curvature of the optical device, wherein a focal length of a first portion of the optical device is higher than a focal length of a second portion of the optical device surrounding the first portion.

Embodiments of the present disclosure substantially eliminate or at least partially address the aforementioned problems in the prior art, and enable the imaging apparatus employing the optical device having the spatially variable focal length to effectively capture distorted images that can be utilized for emulating human-eye resolution.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 4A illustrates an exemplary arrangement of an image sensor and an optical device, while

FIG. 5A illustrates an exemplary arrangement of a user's eye, an image sensor and an optical device, while

FIGS. 7A and 7B illustrate an implementation of an optical device in different states, in accordance with another embodiment of the present disclosure;

FIGS. 8A, 8B, and 8C illustrate an implementation of an optical device in various states, in accordance with yet another embodiment of the present disclosure;

FIG. 9 illustrates an implementation of an optical device, in accordance with still another embodiment of the present disclosure;

Figure 1:
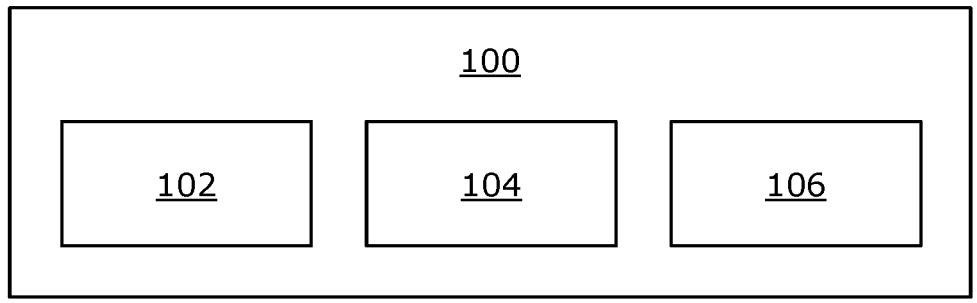
FIG. 1 illustrates an architecture of an imaging apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging apparatus comprising:

an image sensor having a photo-sensitive surface;

an optical device arranged on an optical path of light incidenting on the photo-sensitive surface, the optical device being electrically controllable to have a spatially variable focal length; and a processor configured to:

generate and send a drive signal to the optical device to compensate for a field curvature of the optical device by adjusting focal lengths of different portions of the optical device to different extents, wherein a focal length of a first portion of the optical device is higher than a focal length of a second portion of the optical device surrounding the first portion; and control the image sensor to capture a distorted image of a real-world environment.

In another aspect, an embodiment of the present disclosure provides an optical device comprising:

at least two electrode layers;

a liquid crystal substance disposed between the at least two electrode layers; and a control circuit, coupled to the at least two electrode layers, to be employed to orient molecules of the liquid crystal substance in a given portion of the optical device in a given direction, wherein the control circuit is to be driven to adjust focal lengths of different portions of the optical device to different extents to compensate for a field curvature of the optical device, wherein a focal length of a first portion of the optical device is higher than a focal length of a second portion of the optical device surrounding the first portion.

The present disclosure provides the aforementioned imaging apparatus and the aforementioned optical device. The imaging apparatus utilizes the optical device having the spatially variable focal length to generate the distorted image. The drive signal is beneficially utilized to adjust the focal lengths of the different portions of the optical device to different extents in a manner that even when the optical device is shifted, the distorted image does not have out of focus visual content. Moreover, the distorted image effectively emulates human eye resolution. In other words, an image quality of the distorted image is high irrespective of focusing distances of the optical device, and therefore such a distorted image can be used for various applications. Furthermore, the optical device is simple to design and use, and effectively provides field curvature compensation, whilst providing large distortion in the distorted image, using the spatially variable focal length. Moreover, adjustment of the focus of the optical device (for example, according to changing focusing distances spanning across macro focusing distance to infinity) is performed logically and accurately using the drive signal. The imaging apparatus is small in size, lightweight, has a high resolution, and is easily embeddable in other specialized devices (for example, such as display apparatuses).

Throughout the present disclosure, the term "imaging apparatus" refers to an apparatus for imaging the real-world environment. The imaging apparatus may be used for a variety of applications including but not limited to extended-reality (XR), inspection of the real-world environment, machine vision, gaming, art, and so forth.

Throughout the present disclosure, the term "image sensor" refers to a device which detects light from the real-world environment at its photo-sensitive surface, when said light is incident thereupon. The image sensor comprises a plurality of photo-sensitive elements, which collectively form the photo-sensitive surface of the image sensor. Upon such detection of the light from the real-world environment, the plurality of photo-sensitive elements capture a plurality of image signals. The plurality of image signals are electrical signals pertaining to a real-world scene of the real-world environment. The plurality of image signals are processed (by an image signal processor or the processor of the imaging apparatus) to generate a digital image. A given photo-sensitive element is known as a picture element, or a pixel. It will be appreciated that the plurality of photo-sensitive elements could be arranged in a required manner (for example, such as a rectangular two-dimensional (2D) grid, a polygonal arrangement, a circular arrangement, an elliptical arrangement, a freeform arrangement, and the like) to form the photo-sensitive surface of the image sensor. Examples of the image sensor include, but are not limited to, a charge-coupled device (CCD) image sensor, and a complementary metal-oxide-semiconductor (CMOS) image sensor.

Optionally, the imaging apparatus further comprises a colour filter array arranged with respect to the image sensor in a manner that the light incident upon the image sensor passes through the colour filter array and then detected at the photo-sensitive surface of the image sensor.

Optionally, an image sensor format of the image sensor is small. The term "image sensor format" refers to a shape and a size of the image sensor. The image sensor format of the image sensor determines an angle of view of the optical device when the optical device is used with the image sensor. The size of the image sensor is small, and therefore, a size of the imaging apparatus is small. This enables several imaging apparatuses to be embeddable in other specialized devices (for example, such as display apparatuses) without causing any weight and/or size issues in such specialized devices.

Optionally, a size of a given photo-sensitive element lies in a range of 1-3 micrometres. For example, the size of the given photo-sensitive element may be from 1.0, 1.25, 1.5, 2.0 or 2.5 micrometres up to 1.25, 1.75, 2.0, 2.5, or 3.0 micrometres.

Optionally, a resolution of the imaging apparatus lies in a range of 4-16 megapixels. For example, the resolution of the imaging apparatus may be from 4, 6, 8, 10 or 12 megapixels up to 5, 7, 10, 15 or 16 megapixels. Optionally, an f-number of the imaging apparatus is equal to 2. This provides a narrow depth of field. Other values of the f-number are also feasible.

It will be appreciated that the image sensor may be planar or curved. In some implementations wherein the image sensor is curved, a curvature of the image sensor provides a better performance compared to an image sensor that is planar, in terms of capturing a curved image field. A typical optical device would project light emanating from objects at infinity onto the image sensor provided at a focal length distance therefrom. This means that a typical curvature of the image sensor would have a radius that is equal to the focal length. When the optical device has the spatially variable focal length, and specifically when the different portions of the optical device have a high focal length difference therebetween, focal length distances for projecting the light would also vary. The curvature of the image sensor that is curved emulates this variation in the focal length distances to effectively capture the distorted image at a high quality. This curvature also emulates human visual properties, as a human eye is built similarly, with its retina being curved.

Optionally, an overall radius of the curvature of the image sensor is a function of at least a first radius and a second radius, wherein the first radius is a field curvature radius. This is so because the optical device has the spatially variable focal length across at least its first portion and its second portion. The benefits arising out of use of such an image sensor that is curved may be attributed to these different radii (i.e., the first radius and the second radius) that affect the overall radius of the curvature of the image sensor. When the first radius is represented as R1, the second radius is represented as R2, and the overall radius of the curvature of the image sensor is represented as R, mathematically, $R=1/(R1+R2)$. As an example, a horizontal size of the image sensor may be 3000 pixels, while the size of each pixel may be 1.4 micrometres. Then, the overall radius of curvature of the image sensor may be provided in a manner that bending of the image sensor away from its typical planar imaging plane increases (from zero) on going from a centre of the image sensor towards a periphery of the image sensor. When the overall radius of curvature is 140 millimetres, a maximum bending of the image sensor, at a distance of 2.1 millimetres from its centre, may be 16 micrometres.

In other implementations wherein the image sensor is planar, a field curvature corrector element (for example, such as a field curvature corrector lens) is required to be employed in the imaging apparatus, in order to modify (for example, by flattening) the curved image field into a planar image field for proper capturing at such an image sensor. However, as such a field curvature corrector element may introduce aberrations (which are required to be corrected), the image sensors that are planar tend to have a lower performance as compared to the image sensors that are curved, especially when there exist high focal length differences between the different portions of the optical element.

Throughout the present disclosure, the term "optical device" refers to an optical component through which the light from the real-world environment passes and gets focused on the photo-sensitive surface of the image sensor.

The optical device passes the light through itself in a manner that it forms the distorted image at the image sensor. This may be attributed to the spatially variable focal length of the optical device, which corresponds to spatially variable optical properties of the optical device. The optical device may be implemented by way of a configuration of optical elements and additionally, optionally electro-mechanical elements. A given optical element could be implemented as a lens, a mirror, a prism, a waveguide, or similar. Various implementations of the optical element are described later in more detail.

A sign and a magnitude of the focal length of the given portion of the optical device is indicative of how strongly the optical device converges or diverges light. A positive focal length indicates that the given portion converges light, while a negative focal length indicates that the given portion diverges light. The focal length of the given portion of the given portion of the optical device may be expressed in terms of units of length (such as millimetres, centimetres, and similar) or in dioptres.

The optical device has the spatially variable focal length. In particular, the focal length of different portions of the optical device that are arranged at different spatial locations in the optical device is variable. Such spatial variation in the focal lengths of the different portions of the optical element is provided by the processor which electrically controls and adjusts the focal length in the different portions of the optical element, as required. Since the optical device has the spatially variable focal length, the optical device also has spatially variable magnification/demagnification properties (as such properties are related to focal length). Notably, a given portion having a larger focal length magnifies light passing therethrough to a greater extent as compared to another portion having a smaller focal length. The different portions of the optical device which have different magnification/demagnification properties would magnify/demagnify light passing therethrough to different extents, thereby enabling the distorted image to be captured at the image sensor.

It will be appreciated that the focal length of the first portion of the optical device is higher than the focal length of the second portion of the optical element. Within a given portion of the optical device, focal length may be constant or variable. Optionally, a focal length of the given portion may vary across the given portion in a manner that the focal length reduces on going away from a centre of the given portion towards a periphery of the given portion. A technical effect of variable focal length in the given portion is that it leads to a gradual spatial variation in focal length across the different portions of the optical device, which in turn provides a gradual distortion in the distorted image. When the distorted image is un-distorted (optically and/or digitally) to generate an un-distorted image, there is produced a gradual change in angular resolution within the un-distorted image. The distortion provided in the distorted image is a negative distortion, and is large in magnitude, to accommodate a wide range of field of view angles on the image sensor. As an example, −15 percent distortion may be provided in the distorted image. Other values of distortion that are greater or smaller than this exemplary value are also feasible. For example, the distortion provided in the distorted image may be −30 percent, −60 percent, or similar.

Optionally, the optical device is symmetrical with respect to its optical axis. In such implementations, the optical axis of the optical device passes through a centre of the first portion, wherein the centre of the first portion coincides with a physical centre of the optical device. Therefore, the optical axis of the optical device passes through the physical centre of the optical device. The first portion and the second portion are positioned symmetrically with respect to the physical centre of the optical element and are concentric to each other. In such implementations, the optical device has highest focal length in the physical centre of the optical device, and focal length reduces on going from the physical centre towards a periphery of the optical device. One such exemplary implementation of the optical device has been illustrated in conjunction with FIG. 4A.

Alternatively, optionally, the optical device is asymmetrical with respect to its optical axis. In these implementations, the first portion and the second portion are positioned asymmetrically with respect to the physical centre of the optical element, and the optical axis of the optical device passes through the centre of the first portion, wherein the centre of the first portion lies away from the physical centre of the optical device. Moreover, in these implementations, the optical device has highest focal length in the centre of the first portion, and focal length reduces on going from the physical centre towards a periphery of the optical device. One such exemplary implementation of the optical device has been illustrated in conjunction with FIG. 5A.

Optionally, at least two of the different portions of the optical device are concentric. In this regard, the at least two of the different portions form at least two circular controllable zones about their common centre. These zones are controlled, using the drive signal, for adjusting focal lengths of their corresponding portions to different extents. An innermost portion of the at least two of the different portions has a circular shape while other portion(s) of the at least two of the different portions have circular ring-like shapes. Optionally, the common centre of the at least two of the different portions of the optical device is an optical centre of the optical device. Moreover, optionally, the common centre is the centre of the first portion of the optical device. It will be appreciated that when the optical device is rotationally symmetric, a change in focusing distance (for example, from infinity to 50 cm or to 25 cm) leads to a change in the field curvature. This change in the field curvature occurs in a ring-like manner such that rings at different distances from a point are blurred to different extents. Therefore, having the at least two circular controllable zones facilitates the processor in granularly adjusting the focal lengths of corresponding portions of the optical device to different extents in a ring-like manner that is similar to the change in field curvature. This enables in effectively compensating for the field curvature of the optical device. Moreover, greater the number of concentric portions of the optical device, greater is the granularity of focal length adjustment and field curvature compensation.

Optionally, the focal lengths of the different portions of the optical device are adjusted in a manner that regions of the distorted image which are imaged using peripheral portions of the optical device have a blur level that is less than or equal to a predefined blur level. This ensures that such regions of the distorted image would not be suddenly and excessively blurred upon the adjustment of focal lengths. Such a functionality is especially useful in generating images for video see-through display apparatuses. Optionally, the predefined blur level lies in a range of 5-50 percent of a maximum blur level. It will be appreciated that if the blur level of said regions of the distorted image exceeds the predefined blur level, it would be undesirably perceptible as peripheral vision noise to the user when the user views the distorted image upon un-distortion. Optionally, when a required adjustment in the focal lengths of the different portions causes the blur level of any region of the distorted image to exceed the predefined blur level, said region is made invisible to the user upon un-distortion of the distorted image.

Optionally, the focal length of the first portion of the optical device is more than 1.25 times of the focal length of the second portion of the optical device. In other words, a ratio of the focal length of the first portion and the focal length of the second portion is greater than 1.25. For example, the focal length of the first portion may be 1.25, 1.5, 1.75, 2.0, 2.5, 3.0, 3.5, 4, 5, 6, and so forth, times of the focal length of the second portion. Other ratios of the focal length of the first portion and the focal length of the second portion other than the aforementioned values are also feasible. As an example, the focal length of the first portion may be 4 mm, while the focal length of the second portion may be 2 mm. In such a case, the focal length of the first portion is two times the focal length of the second portion. It will be appreciated that a high ratio of focal length of the first portion and the focal length of the second portion enables in maximizing angular resolution obtained upon un-distorting the distorted image.

Optionally, the focal length of the first portion of the optical device lies in a range of 2.7 mm-7 mm, and the focal length of the second portion of the optical device lies in a range of 0.5 mm to 2.5 mm. More optionally, the focal length of the first portion of the optical device lies in a range of 2.7 mm-4.5 mm, and the focal length of the second portion of the optical device lies in a range of 1.7 mm to 2.3 mm. Yet more optionally, the focal length of the first portion of the optical device lies in a range of 3.5 mm-4.5 mm and the focal length of the second portion of the optical device lies in a range of 1.75 mm to 2.25 mm. For example, the focal length of the first portion of the optical device may be from 2.7, 2.9, 3.1, 3.3, 3.5, 3.7, 3.9, 4.1, 4.3, 4.5, 5.0, 5.5, 6.0, or 6.5 millimetres (mm) up to 3.0, 3.5, 4.0, 4.5, 5.0, 5.5, 6.0, 6.5 or 7.0 millimetres. Moreover, the focal length of the second portion of the optical device may be from 0.5, 0.75, 1.0, 1.5 or 2.0 millimetres up to 1.0, 1.5, 2.0, 2.25, or 2.5 millimetres.

It will be appreciated that a focal length of a given portion of the optical device also affects a depth of field provided by the given portion. The "depth of field" of the given portion is the distance between a nearest and a farthest object that, on being focused by the given portion onto the image sensor, are in acceptably sharp focus in the distorted image. The depth of field of the given portion depends on the focal length of the given portion, focusing distance (i.e., a distance of the given portion to a point of focusing) within the real-world environment, an acceptable size of circle of confusion, and aperture of the imaging apparatus. As an example, the depth of field of the given portion may be inversely related to a square of the focal length of the given portion, and may be directly related to a square of the distance of the given portion to the point of focusing within the real-world environment. Notably, the depth of field is narrow in portions of the optical element having a higher focal length, and is wider in portions of the optical element having a smaller focal length. Therefore, a depth of field of the first portion is narrower as compared to a depth of field of the second portion. As the depth of field of the first portion is narrow, more focusing steps may be required to achieve a requisite adjustment of the focal length of the first portion.

Optionally, the distance of the given portion of the optical device to the point of focusing within the real-world environment lies in a range of 20 cm to infinity. More optionally, the distance of the given portion of the optical device to the point of focusing within the real-world environment lies in a range of 50 cm to infinity. For example, the distance of the given portion to the point of focusing may be from 20, 25, 30, 35, 40, 45, 50, 60, 70, 80, 100 or 120 cm up to 50, 75, 100, 125, 150 or infinity cm. It will be appreciated that as the distance of the given portion to the point of focusing increases, a requisite focal length of the given portion increases, and vice versa.

The processor is coupled to both the image sensor and the optical device. It may be appreciated that the processor controls the overall operation of the imaging apparatus. Additionally, the processor may be coupled to other components of the imaging apparatus.

The drive signal is an electrical signal that is generated and sent to the optical device, by the processor, in order to adjust the focal lengths of the different portions of the optical device to the different extents. This adjustment of the focal lengths compensates for the field curvature of the optical device. The different extents of adjusting the focal lengths depend on an extent of the field curvature and are therefore selected accordingly. The adjustment of the focal lengths in the different portions of the optical device is performed in a manner that the focal length of the first portion is higher than the focal length of the second portion surrounding the first portion. The different focal lengths are responsible for the different magnification/demagnification properties exhibited by the different portions of the optical device, and subsequently, for capturing of the distorted image. The focal lengths are adjusted in a manner that even when the optical device is shifted, the distorted image does not have any out of focus visual content.

Optionally, the focal lengths of the different portions of the optical device are adjusted as a function of an angular distance from the optical centre of the optical device. In other words, the focal lengths of the different portions of the optical device are optionally adjusted as a function of an angular distance from the optical axis of the optical device, wherein the optical axis of the optical device passes through the optical centre of the optical device. In such a case, focal length is maximum at the optical centre of the optical device, and decreases on going away from the optical centre. Herein, the term "angular distance" refers to an angular separation between the optical centre of the optical device and a given portion or a point in the given portion of the optical device. The angular distance may be expressed in terms of degrees or radians. The function of the angular distance from the optical centre of the optical device may be linear or non-linear. Examples of the function include, but are not limited to, a gaussian function, a step function, and a ramp function. The function is selected to be such that a focal length of a portion (or a point of said portion) of the optical device that has a smallest angular distance from the optical centre of the optical device (i.e., is closest to the optical centre) is highest, while a focal length of a portion (or a point of said portion) of the optical device that has a highest angular distance from the optical centre (i.e., is farthest from the optical centre) is lowest. In an example, the focal length of the first portion of the optical device whose centre is concentric with the optical centre of the optical device may be 4 millimetres, whereas the focal length of the second portion that lies at an angular distance of 30 degrees from the optical centre may be 2 millimetres. Across the optical device, the focal lengths of the different portions may be adjusted as the gaussian function. One such exemplary function has been illustrated in conjunction with FIG. 10.

In an embodiment, an optical axis of the image sensor passes through the optical centre of the optical device, and wherein the first portion of the optical device corresponds to a first portion of a field of view of the image sensor that spans between 0 degrees and an angle that lies in a range of 2-50 degrees with respect to the optical axis of the image sensor, and the second portion of the optical device corresponds to a second portion of the field of view that spans between an angle that lies in a range of 12.5-50 degrees and an angle that lies in a range of 45-110 degrees with respect to the optical axis of the image sensor.

In this regard, the optical device is symmetrical with respect to the optical axis of the image sensor. In other words, the first portion and the second portion of the optical device are positioned symmetrically with respect to the optical axis of the image sensor, and the optical axis of the image sensor corresponds to (namely, coincides with) the optical axis of the optical device. Therefore, the first portion of the optical device having the higher focal length focuses light onto the first portion of the field of view of the image sensor that lies in a central region of the image sensor, while the second portion of the optical device having the lower focal length focuses light onto the second portion of the field of view of the image sensor that lies in a peripheral region of the image sensor. The distorted image captured by the image sensor using such an arrangement of the optical device and the image sensor is used to emulate a general manner in which humans typically focus within their field of view. In the un-distorted image generated by un-distorting said distorted image, a central region of the un-distorted image (corresponding to the first portion of the field of view of the image sensor) has a higher angular resolution (and therefore, higher visual quality) as compared to a peripheral region of the un-distorted image (corresponding to the second portion of the field of view of the image sensor).

Optionally, the optical axis of the image sensor passes through a centre of the image sensor. Throughout the present disclosure, the term "field of view" of the image sensor refers to an observable extent of the real-world environment that is captured by the image sensor. The field of view of the image sensor is expressed in terms of degrees or radians. The field of view of the image sensor may depend on the size of the image sensor. Optionally, the field of view of the image sensor is greater than 150 degrees. As an example, the field of view of the image sensor may be 150, 160, 170, 180, 190, 200, 210, 220 degrees, and so forth. As an example, the first portion of the field of view of the image sensor may span between 0 degrees and the angle that may be from 2, 6, 10, 14, 20, 26, 36 or 44 degrees up to 10, 18, 28, 38, 44 or 50 degrees with respect to the optical axis of the image sensor. Moreover, the second portion of the field of view of the image sensor may span between the angle that may be from 12.5, 15, 17.5, 20, 25, 30, 35 or 40 degrees up to 20, 25, 30, 40 or 50 degrees and the angle that may be from 45, 50, 55, 60, 70, 80, 90 or 100 degrees up to 55, 70, 80, 90, 100 or 110 degrees with respect to the optical axis of the image sensor. Therefore, an angular width of the first portion of the field of view of the image sensor may lie in a range of 0 degrees to 100 degrees, while an angular width of the second portion of the field of view of the image sensor may lie in a range of 25 degrees to 220 degrees.

In another embodiment, a line of vision of a user with respect to a field of view of the image sensor passes through the optical centre of the optical device, and wherein the first portion of the optical device corresponds to a first portion of the field of view of the image sensor that spans between 0 degrees and an angle that lies in a range of 2-50 degrees with respect to the line of vision, and the second portion of the optical device corresponds to a second portion of the field of view that spans between an angle that lies in a range of 12.5-50 degrees and an angle that lies in a range of 45-110 degrees with respect to the line of vision.

In this regard, the optical device is asymmetrical with respect to the optical axis of the image sensor. The first portion and the second portion are positioned asymmetrically with respect to the optical axis of the image sensor. The optical axis of the image sensor lies at an angle from the optical axis of the optical device, wherein the optical axis of the optical device corresponds to the line of vision of the user. The distorted image captured by the image sensor using such an arrangement of the optical device and the image sensor is used to emulate a manner in which humans actively change their line of vision within their field of view. The optical centre of the optical device changes dynamically according to the line of vision of the user, based on the drive signal. In the un-distorted image generated by un-distorting said distorted image, a gaze-contingent region of the un-distorted image (corresponding to the line of vision and the first portion of the field of view of the image sensor) has a higher angular resolution (and therefore, higher visual quality) as compared to a remaining region of the un-distorted image (corresponding to the second portion of the field of view of the image sensor).

Throughout the present disclosure, the term "line of vision" refers to an imaginary line along which the user gazes at the real-world environment. In other words, the line of vision of the user lies along a gaze direction of the user in the field of view of the image sensor. As an example, the first portion of the field of view of the image sensor may span between 0 degrees and the angle that may be from 2, 4, 6, 8, 10, 15, 20, 25, 30, or 40 degrees up to 10, 20, 30, 35, 40, 45 or 50 degrees with respect to the line of vision. Moreover, the second portion of the field of view of the image sensor may span between the angle that may be from 12.5, 15, 17.5, 20, 25, 30, 35 or 40 degrees up to 20, 25, 30, 40 or 50 degrees and the angle that may be from 45, 50, 55, 60, 70, 80, 90 or 100 degrees up to 55, 70, 80, 90, 100 or 110 degrees with respect to the line of vision. Therefore, an angular width of the first portion of the field of view of the image sensor may lie in a range of 0 degrees to 100 degrees, while an angular width of the second portion of the field of view of the image sensor may lie in a range of 25 degrees to 220 degrees.

Optionally, the optical device further comprises a third portion arranged between the first portion and the second portion, wherein a focal length of the third portion is lower than the focal length of the first portion, but is higher than the focal length of the second portion, and wherein the third portion of the optical device corresponds to a third portion of the field of view that spans between an angle that lies in a range of 2-12.5 degrees and an angle that lies in a range of 12.5-50 degrees with respect to the optical axis of the image sensor. As an example, the third portion of the field of view may span between the angle that may be from 2, 2.5, 3, 4, 5, 6, 8 or 10 degrees up to 3, 5, 7.5, 10 or 12.5 degrees and the angle that may be from 12.5, 15, 17.5, 20, 25, 30 or 40 degrees up to 20, 30, 40, 45 or 50 degrees with respect to the optical axis of the image sensor.

Thus, the third portion is an intermediate portion arranged between the first portion and the second portion. It beneficially enables a gradual spatial transition in focal length across the optical device. It will be appreciated that the optical device may have at least one intermediate portion arranged between the first portion and the second portion.

The at least one intermediate portion is not limited to only the third portion, but may also include a fourth portion, a fifth portion, and so on.

Optionally, the processor is configured to:

receive, from a display apparatus, information indicative of a gaze direction of a user; and determine, based on the gaze direction, the line of vision of the user with respect to the field of view of the image sensor.

Throughout the present disclosure, the term "display apparatus" refers to specialized equipment that is configured to present an extended-reality (XR) environment to the user when the display apparatus in operation is worn by the user on his/her head. In such an instance, the display apparatus acts as a device (for example, such as an XR headset, a pair of XR glasses, and the like) that is operable to present a visual scene of the XR environment to the user. Commonly, the "display apparatus" is referred to as "head-mounted display apparatus", for the sake of convenience only. Throughout the present disclosure, the term "extended-reality" encompasses virtual reality (VR), augmented reality (AR), mixed reality (MR), and the like.

In some implementations, the imaging apparatus is integrated with the display apparatus. In such implementations, the imaging apparatus is physically coupled to the display apparatus (for example, attached via mechanical and/or electrical connections to components of the display apparatus). For example, several imaging apparatuses may be arranged on an outer surface of the display apparatus that faces the real-world environment, when sizes of such imaging apparatuses are small. Optionally, in such implementations, the processor of the imaging apparatus serves as a processor of the display apparatus. Alternatively, optionally, in such implementations, the processor of the imaging apparatus is communicably coupled to a processor of the display apparatus.

In other implementations, the imaging apparatus is implemented on a remote device that is separate from the display apparatus. In such implementations, the processor of the imaging apparatus and a processor of the display apparatus are communicably coupled, wirelessly and/or in a wired manner. Optionally, the imaging apparatus is mounted on the remote device. Examples of the remote device include, but are not limited to, a drone, a vehicle, and a robot. Optionally, the remote device is physically positioned at the real-world environment, whereas the user of the display apparatus is positioned away from (for example, at a distance from) the remote device.

Optionally, the display apparatus comprises a gaze-tracking system for tracking the gaze direction of the user, wherein the gaze-tracking system is communicably coupled to the processor. The term "gaze-tracking system" refers to a specialized equipment for detecting and/or following the gaze of the user, when the display apparatus in operation is worn by the user. The gaze-tracking system could be implemented as contact lenses with sensors, cameras monitoring a position of a pupil of the user's eye, and the like. Such gaze-tracking systems are well-known in the art. The gaze-tracking system is configured to collect gaze-tracking data, which constitutes the information indicative of the gaze direction of the user. Then, the gaze-tracking system sends the gaze-tracking data (i.e., said information) to the processor. It will be appreciated that the gaze-tracking data is collected repeatedly by the gaze-tracking system throughout a given session of using the display apparatus, as gaze of the user's eyes keeps changing whilst he/she uses the display apparatus. An up-to-date gaze-tracking data (indicative of the gaze direction of the user) allows for producing an up-to-date gaze-contingent distorted image. This distorted image is to be employed to produce an XR image for displaying at the display apparatus.

Optionally, the processor is configured to map the gaze direction of the user to the field of view of the image sensor, for determining the line of vision of the user with respect to the field of view of the image sensor. Optionally, in this regard, the processor is configured to employ a three-dimensional environment mapping algorithm.

The image sensor is controlled, by the processor, to capture the distorted image of the real-world environment. The distorted image is named so because a region thereof that corresponds to the first portion of the optical device having higher focal length appears more zoomed-in (since it is magnified more) as compared to a remaining region of the distorted image that corresponds to the second portion of the optical device having lesser focal length. This makes the captured image appear distorted (namely, warped) if viewed as such. As an example, if a wall of a tunnel having multi-colour checkerboard patches is to be captured using the imaging apparatus, the distorted image thus captured may be such that checkerboard patches corresponding to the line of view of the user would appear much bigger (i.e., magnified), as compared to remaining checkerboard patches surrounding the checkerboard patches corresponding to the line of view. The distorted image would represent all checkerboard patches that are visible in the field of view of the image sensor. However, the remaining checkerboard patches would appear drastically smaller and contracted inwards as compared to the checkerboard patches corresponding to the line of view (which would appear magnified and bulged outwards).

It will be appreciated that an angular resolution of the distorted image is spatially-uniform, when the photo-sensitive elements in the image sensor are uniformly spaced. By "spatially-uniform angular resolution", it is meant that the angular resolution of the distorted image is uniform across the photo-sensitive surface of the (regular) image sensor on which the distorted image is produced. Throughout the present disclosure, the term "angular resolution" of a given image or a region of the given image refers to a number of pixels per degree (namely, points per degree (PPD)) of an angular width of the given image or the region of the given image, wherein the angular width is measured from an imaginary point in a three-dimensional space.

Notably, a number of photo-sensitive elements employed to capture a given angular extent of the real-world environment using the first portion of the optical device is more as compared to a number of photo-sensitive elements employed to capture a same angular extent of the real-world environment using the second portion of the optical device. In other words, a number of photo-sensitive elements employed per unit angular width for the first portion of the field of view of the image sensor is higher than a number of photo-sensitive elements employed per unit angular width for the second portion of the field of view of the image sensor. Typically, the photo-sensitive elements in the image sensor are uniformly spaced (i.e., have a uniform spatial density). Therefore, the captured distorted image will have the spatially-uniform angular resolution. Alternatively, if an arrangement of the photo-sensitive elements in the image sensor follows a requisite distortion pattern, an image captured by the imaging apparatus would not be distorted and therefore would not be require un-distortion. In such a case, the captured image has a spatially variable angular resolution and is optionally shown to the user.

Optionally, when the distorted image is un-distorted to generate the un-distorted image, the un-distorted image has a spatially variable angular resolution. A first region of the un-distorted image that corresponds to the first portion of the field of view of the image sensor has a higher angular resolution as compared to a second region of the un-distorted image that corresponds to the second portion of the field of view of the image sensor. Optionally, an angular resolution of the first region of the un-distorted image is greater than 50 pixels per degree, while an angular resolution of the second region of the un-distorted image is greater than 15 pixels per degree. As an example, the angular resolution of the first region of the un-distorted image may be 60 pixels per degree, while the angular resolution of the second region of the un-distorted image may be 30 pixels per degree. Notably, a magnification/demagnification effect provided whilst un-distorting the distorted image is inverse of a magnification/demagnification effect provided whilst capturing the distorted image.

It will be appreciated that the focal lengths of the first portion and the second portion of the optical device, and the size of the given photo-sensitive element of the image sensor enable provision of the spatially variable angular resolution that emulates human eye resolution, in the un-distorted image. These focal lengths and the size of the given photo-sensitive element define angular resolution that would be achieved in the un-distorted image. In particular, the high ratio of the focal length of the first portion and the focal length of the second portion facilitates in mimicking the human eye resolution and human eye field of view. For example, when pixel size is 1.4 micrometre (um), a (relatively long) focal length of about 4.8 mm may be required for the first portion of the optical device in order for a corresponding region of the un-distorted image to reach human eye angular resolution of over 60 PPD with appropriate image sensor. Even longer focal length may be required if the pixel size increases. For example, a when pixel size is 2 um, a focal length of about 6.9 mm may be required. Short focal lengths mean that a large field of view is captured in the distorted image.

Optionally, the processor of the display apparatus is configured to un-distort the distorted image for generating the undistorted image. This un-distortion provided may be optical un-distortion and/or digital un-distortion. Optionally, the processor of the display apparatus is configured to process the un-distorted image to generate an XR image, and display the XR image via at least one light source. Optionally, the processor of the display apparatus is configured to superimpose visual content on the un-distorted image to generate the XR image, wherein the visual content is at least one of: an image of a given environment, virtual content. A given light source could be implemented as a display or a projector. The projector projects the XR image onto a projection screen or directly onto a retina of the user's eyes. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Examples of such a projector include, but are not limited to, an LCD-based projector, an LED-based projector, an OLED-based projector, an LCoS-based projector, a Digital Light Processing (DLP)-based projector, and a laser projector.

In an embodiment, the optical device comprises:
at least two electrode layers;
a liquid crystal substance disposed between the at least two electrode layers; and
a control circuit, coupled to the at least two electrode layers, to be employed to orient molecules of the liquid crystal substance in a given portion of the optical device in a given direction, based on the drive signal.

Figure 6A:
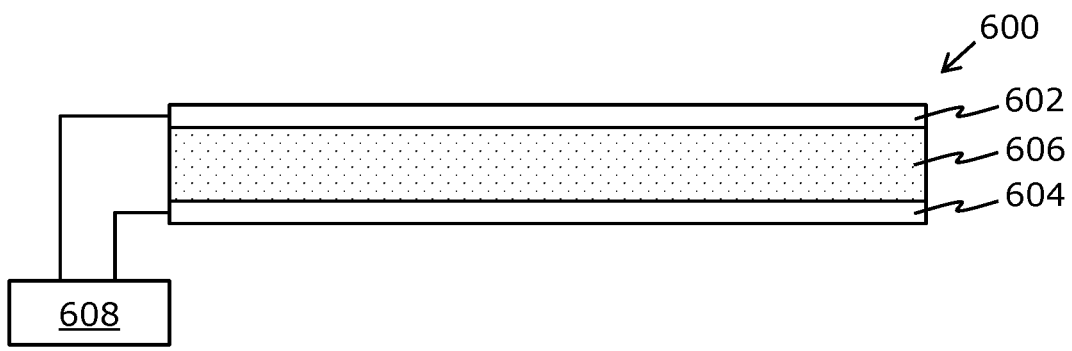
FIGs. 6A-6E illustrate various implementations of an optical device, in accordance with an embodiment of the present disclosure.

In this regard, the optical device is a liquid crystal device which passes light through itself, as required. The electrode layer is a layer of an electrically conductive material, which is used for providing electrical signal (i.e., the drive signal) to a non-conductive substance such as the liquid crystal substance. The at least two electrode layers may be driven with alternating current (AC), wherein frequency and/or amplitude of the AC may be varied. The at least two electrode layers could be arranged on a same plane. There could be arranged four or more electrode layers on opposite sides of glass, and the like. A given electrode layer may be manufactured using a material including, but not limited to, Indium tin oxide (ITO), graphite, boron, silver, copper, nickel, gold, titanium, or lithium-rich nickel manganese cobalt oxide. Optionally, the given electrode layer is transparent. The liquid crystal substance is a liquid crystal medium comprising liquid crystal molecules. The liquid crystal substance may flow like a liquid, but its molecules may be oriented in a crystal-like manner. The control circuit is a specialized circuit that electrically controls the liquid-crystal substance disposed between the at least two electrode layers. The control circuit is electrically coupled with the at least two electrode layers and the processor. One such optical device has been illustrated in conjunction with FIG. 6A.

In operation, the control circuit optionally applies the drive signal (and specifically, electrical voltage) to the at least two electrode layers, to orient molecules of the liquid crystal substance in different portions of the optical device in different directions, so as to provide different focal lengths in the different portions. The drive signal provides an electric field that causes the molecules of the liquid crystal substance in the different portions to align differently, thereby changing a refractive index of the different portions. The first portion of the optical device has a lower refractive index, and therefore, a higher focal length, as compared to the second portion of the optical device. A gradient of refractive indices of the different portions of the optical device provides the spatially variable focal length in the optical device. It will be appreciated that a strength of the drive signal affects a strength of the electric field provided, which in turn affects molecular alignment of the molecules of the liquid crystal substance in the given portion of the optical device, and subsequently, the focal length of the given portion of the optical device. Beneficially, such an implementation of the optical device is tunable, using the drive signal, as per requirement. Moreover, a high switching speed of such an optical device facilitates in fast refocussing thereof.

Optionally, at least one of: a thickness, a concentration of the liquid crystal substance disposed between the at least two electrode layers is maximum at an optical centre of the optical device and decreases as a function of a distance from the optical centre. In this regard, variation of the thickness and/or the concentration of the liquid crystal substance disposed between the at least two electrode layers across the optical device provides the spatially variable focal length in the optical device. The focal length of the optical device varies with the thickness of the liquid crystal substance in a manner that greater the thickness of the liquid crystal substance in a given portion of the optical device, higher is a focal length of the given portion of the optical device, and vice versa. Likewise, the focal length of the optical device varies with the thickness of the liquid crystal substance in a manner that greater the concentration of the liquid crystal substance in a given portion of the optical device, higher is a focal length of the given portion of the optical device, and vice versa. Examples of the function include, but are not limited to, a gaussian function, a step function, and a ramp function. When the thickness and/or the concentration of the liquid crystal substance optionally varies (linearly or non-linearly) across the field of view of the image sensor, it creates an uneven electrical field in the optical device, upon provision of the drive signal. Thus, the focal lengths in different portions of the optical device would vary with thickness and/or concentration of the liquid crystal substance. The technical effect of this is that the focal length would be maximum at the optical centre and would decrease towards the periphery. One such optical device has been illustrated in conjunction with FIG. 6B.

It will be appreciated that the thickness of the liquid crystal substance may be expressed in units of length (for example, micrometres, millimetres, centimetres, and the like). As an example, a thickness of the liquid crystal substance disposed between the at least two electrode layers may be 50 micrometres. Likewise, the concentration of the liquid crystal substance may be expressed in units of molar concentration (for example, number of molecules per unit volume of the liquid crystal substance).

Optionally, at least one of: a spacing between the at least two electrode layers, voltages applied to the at least two electrode layers vary as a function of a distance from an optical centre of the optical device. Since the liquid crystal substance is disposed between the at least two electrode layers, the spacing between the at least two electrode layers may directly be related to the thickness and/or the concentration of the liquid crystal substance disposed between the at least two electrode layers. The variation in the spacing between the at least two electrode layers would result in different focal lengths of the different portions of the optical device that lie at different distances from the optical centre of the optical device. Optionally, the spacing between the at least two electrode layers decreases as the distance from the optical centre of the optical device increases. The spacing may be higher towards the centre of the optical device, and may decrease on going towards the edges of the optical device. As a result, the focal length of the first portion that is closer to the optical centre of the device is higher than the focal length of the second portion that is farther form the optical centre.

Similarly, the optional variation in the voltages applied to the at least two electrode layers causes a variation an electric field between the at least two electrode layers. This results in a variation in the orientation of the molecules of the liquid crystal substance across the at least two electrode layers, and a variation in focal length across different portions of the optical device. Optionally, the voltage being applied to the at least two electrode layers reduces as the distance from the optical centre of the optical device increases. The voltage may be higher towards the centre of the optical device, and may decrease on going towards the edges of the optical device. As a result, the focal length of the first portion that is closer to the optical centre of the device is higher than the focal length of the second portion that is farther form the optical centre.

Optionally, the optical device is implemented as at least two liquid crystal lenses having different diameters, wherein the at least two liquid crystal lenses are stacked in a decreasing order of diameters. In this regard, a liquid crystal lens having a largest diameter amongst the at least two liquid crystal lenses is stacked first (i.e., it lies at a bottom of the stack), followed by a liquid crystal lens having a second-largest diameter, and so on, until a liquid crystal lens having a smallest diameter is stacked at last. Stacking of liquid crystal lens having varying diameters produces varying optical power in the optical device such that the optical power is maximum in a portion of the optical device where a maximum number of liquid crystal lenses are stacked, while the optical power is minimum in a portion of the optical device where a minimum number of liquid crystal lenses are stacked. Correspondingly, the portion of the optical device where the optical power is maximum has a highest focal length, while the portion of the optical device where the optical power is minimum has a lowest focal length. Different portions of the optical device having different optical powers correspond to different portions of the field of view of the image sensor.

In some implementations, the at least two liquid crystal lenses having different diameters are stacked symmetrically about an optical axis of the optical device. The "optical axis of the optical device" refers to an imaginary line along which light propagates within the optical device. In such implementations, optical centres of the at least two liquid crystal lenses lie along the optical axis of the optical device. Therefore, an optical power in a central portion (i.e., the first portion) of the optical device is more than an optical power in a peripheral portion (i.e., the second portion) of the optical device, thereby providing a higher focal length in the central portion and a lower focal length in the peripheral portion. Two such exemplary implementations of the optical device have been illustrated in conjunction with FIGS. 6D and 6E.

In other implementations, the at least two liquid crystal lenses having different diameters are stacked asymmetrically about the optical axis of the optical device. In such implementations, optical centres of the at least two liquid crystal lenses lie away from the optical axis of the optical device. The first portion of the optical device, having the higher optical power and focal length, lies away from the optical axis of the optical device, and is surrounded by the second portion.

Optionally, the at least two liquid crystal lenses are stacked in an increasing order of diameters. Alternatively, optionally, the at least two liquid crystal lenses are stacked in any order, irrespective of their diameters. Optionally, the at least two liquid crystal lenses have a same optical power. Alternatively, optionally, the at least two liquid crystal lenses have different optical powers.

Optionally, the imaging apparatus further comprises a lens arranged on an optical path between the real-world environment and the optical device that is implemented as at least two liquid crystal lenses having different diameters. In some cases, the lens may be focused to infinity, and the at least two liquid crystal lenses may be provided with negative optical power (for example, −1 dioptre). In some other cases, the lens may be focused to a macro distance, and the at least two liquid crystal lenses may be provided with positive optical power (for example, +1 dioptre). It will be appreciated that the lens may be a fixed lens or a moving lens.

As an example, one or more of the at least two liquid crystal lenses that are stacked symmetrically may be activated between 0 and −1 D (i.e., −1 dioptre). When, for example, three liquid crystal lenses are activated to −1 dioptre, this would mean that a centre FOV corresponding to all the three liquid crystal lenses would have an optical power of −3 dioptres (i.e., −1−1−1=−3 dioptres), a next non-overlapping FOV corresponding to two of the three liquid crystal lenses would have an optical power of −2 dioptres and a last non-overlapping FOV corresponding to one of the three liquid crystal lenses would have an optical power of −1 dioptre.

In another embodiment, the optical device comprises:
a polymer lens; and
at least one micro-electro-mechanical element arranged in contact with at least one surface of the polymer lens,
wherein the at least one micro-electro-mechanical element is controlled, based on the drive signal, to deform the shape of the at least one surface.

In this regard, the polymer lens is made of a polymeric material, and is flexible. The polymeric material has a specific refractive index. The micro-electro-mechanical element is a miniaturized (i.e., micro-sized) electro-mechanical element. The micro-electro-mechanical element may be made using well-known microfabrication techniques. The at least one micro-electro-mechanical element is arranged in close contact with the at least one surface of the polymer lens. In operation, the at least one micro-electro-mechanical element exerts a force on the at least one surface of the polymer lens (which is generally soft in nature), to mechanically deform the shape of the at least one surface, and resultantly alter a shape of the polymer lens.

Optionally, the micro-electro-mechanical element is controlled to deform the shape of the at least one surface in a manner that a thickness of the polymer lens is maximum at an optical centre of the polymer lens and decreases as a function of a distance from the optical centre. When the micro-electro-mechanical element deforms the shape of the at least one surface based on the drive signal, a spatially variable focal length is provided in the polymer lens. In particular, a portion of the polymer lens that has higher thickness has a higher focal length as compared to another portion of the polymer lens that has lower thickness. Such an implementation of the optical device is beneficially small in size, easy to integrate in the imaging apparatus, easy to use and modify as per requirement. Moreover, such an optical device is robust as it is highly resistant to vibration, shock, and radiation. One such exemplary implementation of the optical device has been illustrated in conjunction with FIGS. 7A and 7B.

In yet another embodiment, the optical device comprises:
a varifocal composite lens comprising two optical elements, each having a planar surface and a surface having a freeform shape, wherein planar surfaces of the two optical elements are slidable over each other; and
at least two actuators that are to be employed to produce a relative lateral displacement between the two optical elements in a direction perpendicular to an optical axis of the optical device, wherein the at least two actuators are controlled based on the drive signal.

Throughout the present disclosure, the term "varifocal composite lens" refers to a composite lens that is formed by the two optical elements in a manner that the composite lens exhibits variable focal length. A geometry and an arrangement of the two optical elements provides the variation in the focal length throughout the varifocal composite lens. Optionally, the varifocal composite lens is implemented as an Alvarez lens. The Alvarez lens is based on lateral shift of the two optical elements (which are transmissive refractive optical elements), each optical element having the planar surface and the surface having the freeform shape. The freeform shape may have a two-dimensional cubic profile. The two freeform shaped surfaces of the optical elements are conjugate, rotationally asymmetric, and aspheric. Optionally, the two freeform shaped surfaces are complimentary to each other. The two optical elements slidably overlap with each other in a two-dimensional plane that is perpendicular to the optical axis of the optical device. One such optical device comprising the varifocal composite lens and the at least two actuators has been illustrated in conjunction with FIGS. 8A, 8B, and 8C.

Based on the drive signal received from the processor, the at least two actuators optionally produce the relative lateral displacement between the two optical elements by sliding the two optical elements across each other. This enables in adjusting the focal length in different portions of the optical device. In any given arrangement of the two optical elements of the varifocal composite lens, a portion of the varifocal composite lens having higher thickness as compared to a remaining portion of the varifocal composite lens will have a higher focal length as compared to the remaining portion. Such an implementation of the optical device is easily controllable using the drive signal, for providing a large range of variation in focal lengths. Moreover, such an optical device is highly stable against external disturbances.

Herein, the term "actuator" refers to an equipment that is employed to rotate, tilt and/or shift a component with which it is associated. A given actuator may, for example, include electrical components, mechanical components, magnetic components, polymeric components and so forth. The given actuator is driven by the drive signal, which could be a piezoelectric force, an electromagnetic force, a mechanical torque, an electric current, a hydraulic pressure, a pneumatic pressure or similar.

In still another embodiment, the optical device comprises a liquid lens, wherein at least one of: a curvature, a refractive index of the liquid lens is electrically controlled based on the drive signal. Throughout the present disclosure, the term "liquid lens" refers to a lens that is implemented as a cell filled with an optical-grade liquid. The liquid lens is electrically controllable, using the drive signal. Optionally, the optical-grade liquid contained inside the cell comprises two immiscible liquids: a non-conductive oil and a water solution separated by an interface. The functionality of the liquid lens is based on electrostatic actuating of the optical-grade liquid. In operation, electrical voltage is applied to the cell based on the drive signal from the processor, thereby controlling the curvature of the liquid lens and/or the refractive index of the optical-grade liquid of the liquid lens. Different portions of the liquid lens are controlled, using the drive signal, to have different curvatures and/or different refractive indices, thereby having different focal lengths. Optionally, the electrical voltage is applied at an interface between the two immiscible liquids of the optical-grade liquid. Greater the curvature of a given portion of the liquid lens, greater is the focal length of the given portion. Likewise, greater the refractive index of the given portion of the liquid lens, smaller is the focal length of the given portion. The liquid lens is controllable to rapidly adjust the focal length of the different portions of the optical device based on the drive signal. Therefore, a refocussing time of such an optical device is short. One such exemplary implementation of the optical device has been illustrated in conjunction with FIG. 9.

The various implementations of the optical device described hereinabove provide a focusing effect such that edges of the field of view of the image sensor lie inside of an acceptable circle of confusion (0.72/MTF50) even in cases of extreme distances (i.e., macro distance and infinity) between a given portion of the optical device to the point of focusing. In other words, field curvature of the imaging apparatus is designed so that decent focus is obtained over an entire range of focusing distances. A measurement of optical performance of potential of a given portion of the optical device may be made using a through focus curve (also known as a Modulation Transfer Function (MTF) curve or a through focus MTF curve) of the given portion. The optical element described herein has acceptable MTF resolution at all its portions for all distances to the point of focusing, thereby providing a high image quality of the distorted image. As an example, MTF value for the given portion of the optical device is greater than or equal to 0.2 (20%). Through focus MTF curves for the different portions of the optical device specify a maximum allowable focal shift in MTF (i.e., a depth of focus) for the different portions. The drive signal adjusts the focal lengths of (i.e., refocuses) the different portions of the optical device in a manner that MTF values of the different portions lie within acceptable MTF drop levels from peak MTF values according to the through focus MTF curves, for generating a high-quality distorted image.

Optionally, at least one of: rotation, tilt, shift of the optical device is controlled based on the drive signal. Such controlling pertains to movement of the optical device for adjusting the focal lengths of different portions of the optical device and/or providing field curvature compensation in the imaging apparatus. The drive signal is generated to provide a requisite movement of the optical device. Optionally, in this regard, the drive signal is sent to at least one actuator associated with the optical device, wherein the at least one actuator is configured to control at least one of: rotation, tilt, shift of the optical device, based on the drive signal.

Optionally, rotation and/or tilt of the optical device is controlled based on the information indicative of the gaze direction of the user. In such a case, the optical device is rotated and/or tilted in a manner that light emanating from a region of the real-world environment which corresponds to the gaze direction of the user passes through the first portion of the optical device, whereas light emanating from remaining regions of the real-world environment pass through the second portion of optical device. As an example, when the optical device is asymmetrical about its optical axis (i.e., the optical centre of the optical device is not the physical centre of the optical device), the optical device may be rotated about its physical centre to cover via its first portion, an area corresponding to the first portion of the field of view of the image sensor, on the photo-sensitive surface of the image sensor.

Optionally, shifting of the optical device is performed by at least one of: moving the optical device along its optical axis, moving the optical device obliquely or perpendicularly with respect to its optical axis. Optionally, when the optical device is moved away from the image sensor, the focal lengths of the different portions of the optical device would increase, and vice versa. It will be appreciated that the drive signal beneficially provides field curvature compensation by suitably adjusting the focal lengths of the different portions of the optical device to different extents in a manner that even when the optical device is shifted, the distorted image does not have any out of focus visual content.

Optionally, the processor is configured to:
receive, from a display apparatus, information indicative of gaze directions of a user;
determine a gaze point in the real-world environment, based on a convergence of the gaze directions; and
generate the drive signal based on an optical depth of the gaze point in the real-world environment.

In this regard, the "gaze point" is a point in the real-world environment at which the user's gaze is focused. The gaze point is a point of interest of the user, in the real-world environment. Optionally, the gaze point is determined by mapping the gaze directions of the user's eyes to a corresponding point in the real-world environment, at which the gaze directions converge.

The "optical depth" of the gaze point refers to an optical distance between the gaze point and the imaging apparatus, in the real-world environment. The gaze point could be very close to the imaging apparatus (in which case, the optical device is macro focussed), at a moderate distance from the imaging apparatus, or very far from the imaging apparatus (in which case, the optical device is focussed at infinity). Optionally, the optical depth of the gaze point in the real-world environment lies in a range of 20 cm to infinity. More optionally, the optical depth of the gaze point in the real-world environment lies in a range of 50 cm to infinity. For example, the optical depth of the gaze point may be from 20, 25, 30, 35, 40, 45, 50, 60, 70, 80, 100 or 120 cm up to 50, 75, 100, 125, 150 or infinity cm.

It will be appreciated that the user may gaze at various points in the real-world environment, at various time instants. Generating the drive signal based optionally on the optical depth of the gaze point in the real-world environment facilitates in dynamically adjusting the focal lengths of the different portions of the optical device in a manner that the gaze point appears sharp and is visually well-captured in the distorted image. A focal length of a portion of the optical device corresponding to the gaze point is adjusted according to the optical depth of the gaze point. In other words, a focal plane is adjusted corresponding to the optical depth of the gaze point. When such a distorted image is un-distorted to generate the un-distorted image, the un-distorted image emulates foveation properties of the human visual system. Then, the gaze point is represented in the un-distorted image at a higher angular resolution (i.e., higher visual detail) as compared to other points of the real-world environment. Moreover, when the optical device optionally has concentric portions that are controllable, and gaze-tracking is also employed for locally adjusting the focal plane, the processor is able to accurately and granularly adjust the focal lengths of the different portions of the optical device to provide effective field curvature compensation.

Optionally, when the optical depth of the gaze point in the real-world decreases, the drive signal is generated in a manner that the focal lengths of the different portions of the optical device increase. Optionally, in this regard, an increase in the focal length of the first portion of the optical device is greater than an increase in the focal length of the second portion of the optical device. As an example, the optical depth of the gaze point may decrease from 1000 mm (or 100 cm) to 500 mm (or 50 cm). In such a case, the increase in the focal length (which may be 4 mm) of the first portion may be approximately 16 pm, whereas the increase in the focal length (which may be 2 mm) of the second portion may be approximately 4 μm.

Alternatively, optionally, when the optical depth of the gaze point in the real-world increases, the drive signal is generated in a manner that the focal lengths of the different portions of the optical device decrease. Optionally, in this regard, a decrease in the focal length of the first portion of the optical device is greater than a decrease in the focal length of the second portion of the optical device.

Optionally, the processor is configured to generate the drive signal based on at least one of: a depth map, a contrast analysis of the real-world environment. Generation of the drive signal in this manner enables the focal lengths of different portions of the optical device to be suitably adjusted for focusing on a requisite optical depth in the real-world environment and/or for obtaining a requisite contrast in the distorted image of the real-world environment. As a result, (i) objects or their portions lying at the requisite optical depth appear to have a high visual detail in the distorted image, and/or (ii) the distorted image has a requisite high contrast resolution.

The term "depth map" refers to a data structure comprising information pertaining to optical depths of objects or their portions within the real-world environment from a viewpoint. The depth map could be generated using a video see-through (VST) image or a depth image. Optionally, the depth map is an image comprising a plurality of pixels, wherein a colour of each pixel indicates an optical depth of its corresponding real point/region within the real-world environment. Optionally, the processor is configured to: determine, using the depth map, a given optical depth at which the optical device is required to be focused; and generate the drive signal to adjust the focal lengths of the different portions of the optical device for focusing at the given optical depth.

Optionally, the processor is configured to perform the contrast analysis of the real-world environment, prior to generating the drive signal. Optionally, when performing the contrast analysis, the processor is configured to: determine differences in intensities between adjacent pixels of a previously-captured distorted image, the previously-captured distorted image having been captured corresponding to previous focal lengths of the different portions of the optical device; and determine a previous contrast resolution of the previously-captured distorted image, based on said differences in intensities. Then, optionally, the processor is configured to: determine a required adjustment in the previous focal lengths of the different portions of the optical device which, when implemented, would cause a next contrast resolution of a next distorted image to be higher than the previous contrast resolution of the previously-captured distorted image; and generate the drive signal to implement the required adjustment in the previous focal lengths of the different portions of the optical device. The contrast analysis of the real-world environment may be performed until a maximal contrast resolution (and its corresponding focal lengths of the different portions of the optical device) are determined.

Optionally, the processor is configured to generate the drive signal based also on focus information obtained from at least one of: a Phase Detection Auto-Focus (PDAF) sensor, a time-of-flight (ToF) sensor, eye convergence and stereo depth data of a video see through camera pair. This focus information is indicative of a quality of focus obtained in the distorted image, for given focal lengths of the different portions of the optical device. The drive signal can be generated for implementing the required adjustment in the given focal lengths, which would improve the quality of focus.

Optionally, the imaging apparatus further comprises a meniscus liquid crystal lens, wherein the processor is configured to control the meniscus liquid crystal lens to compensate for the field curvature of the optical device. The meniscus liquid crystal lens is controlled using the drive signal. Optionally, the meniscus liquid crystal lens is arranged on an optical path between the optical device and the image sensor. Optionally, the meniscus liquid crystal lens is achromatic. An optical power of the meniscus liquid crystal lens is lesser than an optical power of the optical device (which would primarily focus the light on the image sensor). Optical characteristics of the meniscus liquid crystal lens are dependent on a focal plane setting, so the optical characteristics could be different for different settings of the optical element with respect to the photo-sensitive surface of the image sensor. The drive signal provides requisite optical characteristics of the meniscus liquid crystal lens, so that further field compensation is provided upon passage of the light through the meniscus liquid crystal lens. For example, the drive signal is used to control optical properties (such as thickness, concentration, refractive index, shape, and similar) of the meniscus liquid crystal lens. Therefore, the meniscus liquid crystal lens serves as an adaptive lens for field curvature compensation. The meniscus liquid crystal lens further assists (the optical device) in compensating for the field curvature of the optical device.

Optionally, the meniscus liquid crystal lens is implemented as at least one of: a liquid crystal lens, an Alvarez lens, a polymer lens. The meniscus liquid crystal lens could be implemented as a singular optical element or a plurality of optical elements. Moreover, one or more of various optical surfaces of the meniscus liquid crystal lens could be implemented by a liquid crystal lens, thereby yielding a hybrid arrangement of one or more liquid crystal surfaces with one or more conventional lenses. In an example, the meniscus liquid crystal lens may be implemented as a MEMS-controlled polymer lens with an additional lens. In another example, the meniscus liquid crystal lens may be implemented as a configuration of lenses, wherein one or more optical surfaces of the configuration is implemented as the liquid crystal lens. Various exemplary implementations of the meniscus liquid crystal lens are illustrated in FIGS. 13A-13F.

The present disclosure also relates to the optical device as described above. Various embodiments and variants disclosed above, with respect to the aforementioned first aspect, apply mutatis mutandis to the optical device.

Optionally, in the optical device, the focal lengths of the different portions of the optical device are adjusted as a function of an angular distance from an optical centre of the optical device.

Optionally, in the optical device, at least two of the different portions of the optical device are concentric.

Optionally, in the optical device, at least one of: a thickness, a concentration of the liquid crystal substance disposed between the at least two electrode layers is maximum at an optical centre of the optical device and decreases as a function of a distance from the optical centre.

Optionally, in the optical device, at least one of: a spacing between the at least two electrode layers, voltages applied to the at least two electrode layers vary as a function of a distance from an optical centre of the optical device.

Optionally, the optical device is implemented as at least two liquid crystal lenses having different diameters, wherein the at least two liquid crystal lenses are stacked in a decreasing order of diameters.

Experimental Part

A test simulation of focal length adjustment scenarios of the optical device and a conventional optical device for three optical depths of focusing was performed. Based on the test simulation, it was observed that the optical device provides better MTF resolution for the three optical depths of focusing, as compared to the conventional optical device. Moreover, it was observed experimentally that MTF resolution provided by the different portions of the optical device is high enough to provide a high image quality of the distorted image, which further enables the distorted image to be used, upon un-distorting, for emulating human eye resolution. A detailed description of the observations of the test simulations is provided hereinbelow in conjunction with FIGS. 14, 15 and 16.

DETAILED DESCRIPTION OF THE DRAWINGS

Referring to FIG. 1, illustrated is an architecture of an imaging apparatus 100, in accordance with an embodiment of the present disclosure. The imaging apparatus 100 comprises an image sensor 102, an optical device 104, and a processor 106. The processor 106 is coupled to the image sensor 102 and the optical device 104.

Figure 2:
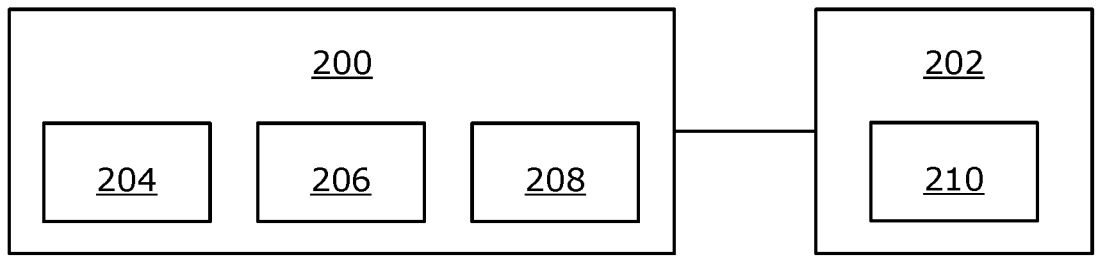
FIG. 2 illustrates an exemplary scenario of using an imaging apparatus in conjunction with a display apparatus, in accordance with an embodiment of the present disclosure.

Referring to FIG. 2, illustrated is an exemplary scenario of using an imaging apparatus 200 in conjunction with a display apparatus 202, in accordance with an embodiment of the present disclosure. The imaging apparatus 200 comprises an image sensor 204, an optical device 206, and a processor 208. The processor 208 is coupled to the image sensor 204 and the optical device 206. The display apparatus 202 comprises a gaze-tracking system 210. The imaging apparatus 200 and the display apparatus 202 are communicably coupled to each other, for example, via a communicable coupling between the processor 208 and the gaze-tracking system 210.

FIGS. 1 and 2 include simplified architectures of the imaging apparatus 100 and 200, respectively, for the sake of clarity only, which should not unduly limit the scope of the claims herein. The person skilled in the art will recognize many variations, alternatives, and modifications of embodiments of the present disclosure.

Figure 3:
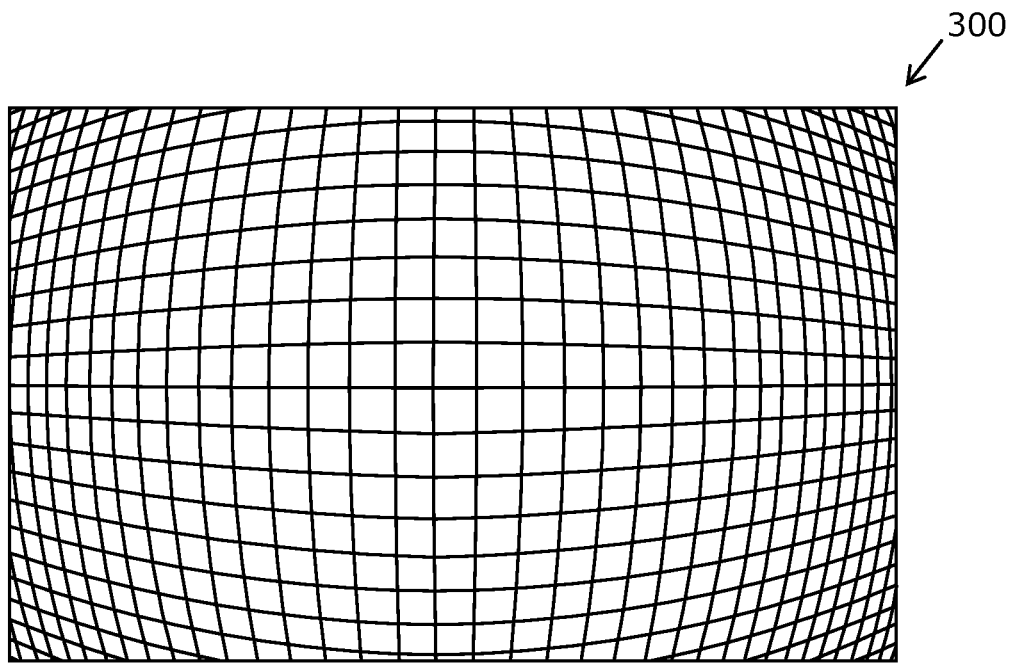
FIG. 3 illustrates a distorted image that is captured by an imaging apparatus, in accordance with an embodiment of the present disclosure.

Referring to FIG. 3, illustrated is a distorted image 300 that is captured by an imaging apparatus (not shown), in accordance with an embodiment of the present disclosure. The distorted image 300 has a same angular resolution across a photo-sensitive surface of an image sensor (not shown) of the imaging apparatus.

Figure 4A:
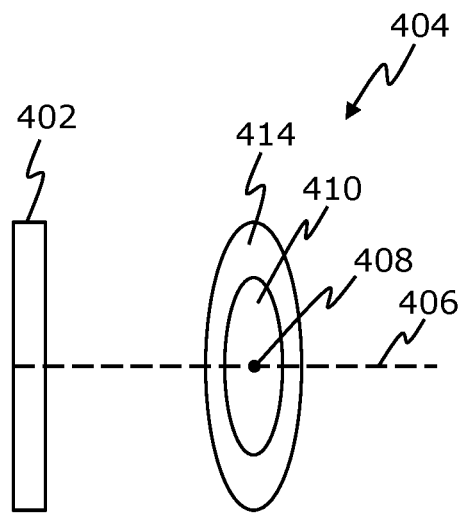
Figure 4B:
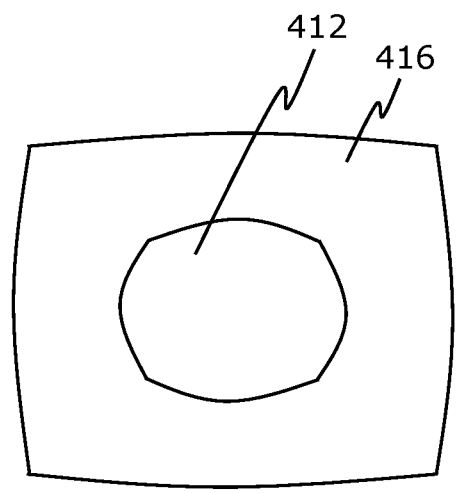
FIG. 4B illustrates a field of view of the image sensor of FIG. 4A, in accordance with an embodiment of the present disclosure.

Referring to FIGS. 4A and 4B, FIG. 4A illustrates an exemplary arrangement of an image sensor 402 and an optical device 404, while FIG. 4B illustrates a field of view of the image sensor 402 of FIG. 4A, in accordance with an embodiment of the present disclosure. An optical axis 406 of the image sensor 402 passes through an optical centre 408 of the optical device 404. A first portion 410 of the optical device 404 corresponds to a first portion 412 of a field of view of the image sensor 402 that spans between 0 degrees and an angle that lies in a range of 2-50 degrees with respect to the optical axis 406 of the image sensor 402. A second portion 414 of the optical device 404 corresponds to a second portion 416 of the field of view that spans between an angle that lies in a range of 12.5-50 degrees and an angle that lies in a range of 45-110 degrees with respect to the optical axis 406 of the image sensor 402. The optical device 404 is shown to be symmetrical about its optical axis. The optical centre 408 of the optical device 404 is also a physical centre of the optical device 404.

Figure 5A:
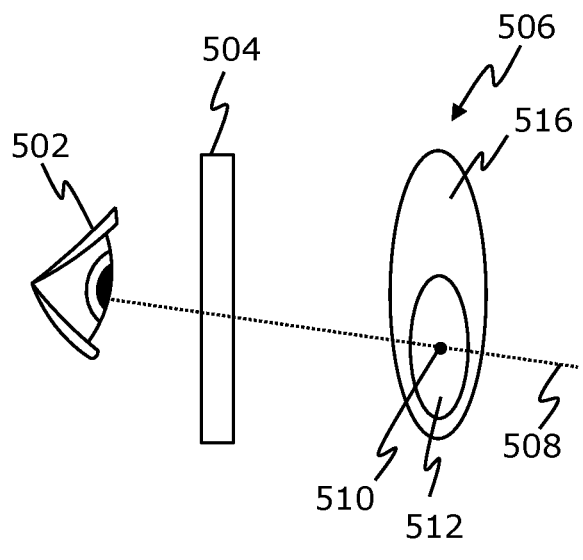
Figure 5B:
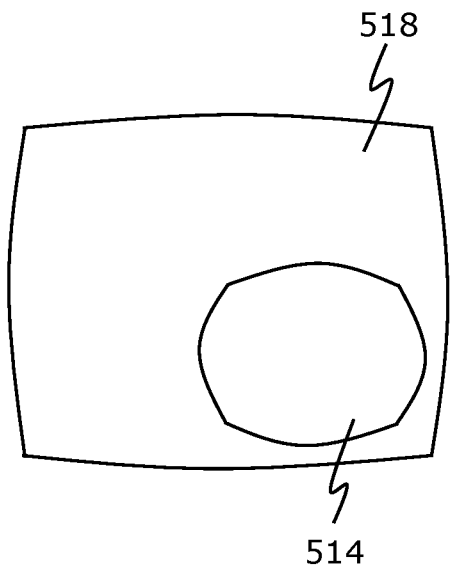
FIG. 5B illustrates a field of view of the image sensor of FIG. 5A, in accordance with another embodiment of the present disclosure.

Referring to FIGS. 5A and 5B, FIG. 5A illustrates an exemplary arrangement of a user's eye 502, an image sensor 504 and an optical device 506, while FIG. 5B illustrates a field of view of the image sensor 504 of FIG. 5A, in accordance with another embodiment of the present disclosure. A line of vision 508 of a user (and specifically, the user's eye 502) with respect to the field of view of the image sensor 504 passes through an optical centre 510 of the optical device 506. A first portion 512 of the optical device 506 corresponds to a first portion 514 of the field of view of the image sensor 504 that spans between 0 degrees and an angle that lies in a range of 2-50 degrees with respect to the line of vision 508. A second portion 516 of the optical device 506 corresponds to a second portion 518 of the field of view that spans between an angle that lies in a range of 12.5-50 degrees and an angle that lies in a range of 45-110 degrees with respect to the line of vision 508. The optical device 506 is shown to be asymmetrical about its optical axis. The optical centre 510 of the optical device 506 is not a physical centre of the optical device 506. The optical device 506 is rotated about its physical centre to cover via its first portion 514, an area corresponding to the first portion 514 of the field of view, on a photo-sensitive surface of the image sensor 504.

Referring to FIGS. 6A-6E, illustrated are various implementations of an optical device 600, in accordance with an embodiment of the present disclosure. It may be understood by a person skilled in the art that the FIGS. 6A-6E include simplified implementations of the optical device 600 for the sake of clarity only, which should not unduly limit the scope of the claims herein. The person skilled in the art will recognize many variations, alternatives, and modifications of embodiments of the present disclosure.

The optical device 600 comprises at least two electrode layers (depicted as electrode layers 602 and 604), a liquid crystal substance 606 disposed between the at least two electrode layers 602 and 604, and a control circuit 608 coupled to the at least two electrode layers 602 and 604. The control circuit 608 is to be employed to orient molecules of the liquid crystal substance 606 in a given portion of the optical device 600 in a given direction, based on a drive signal.

Figure 6B:
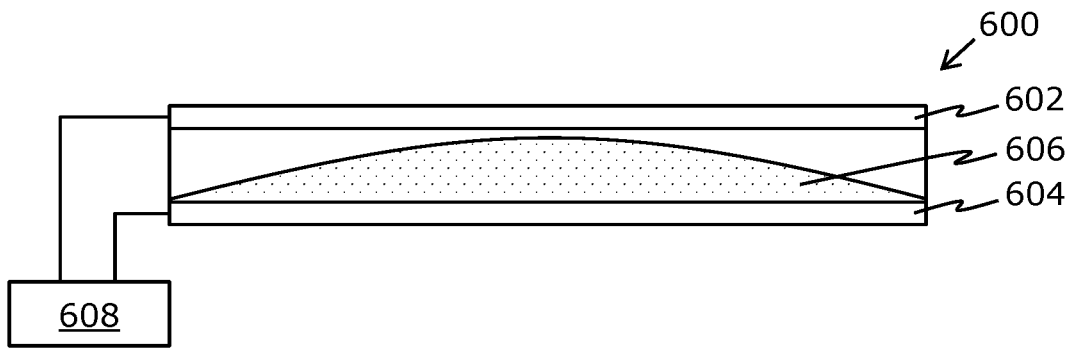

In FIG. 6B, a thickness and/or a concentration of the liquid crystal substance 606 disposed between the at least two electrode layers 602 and 604 is shown to be maximum at an optical centre of the optical device 600 and decreases as a function of a distance from the optical centre.

Figure 6C:
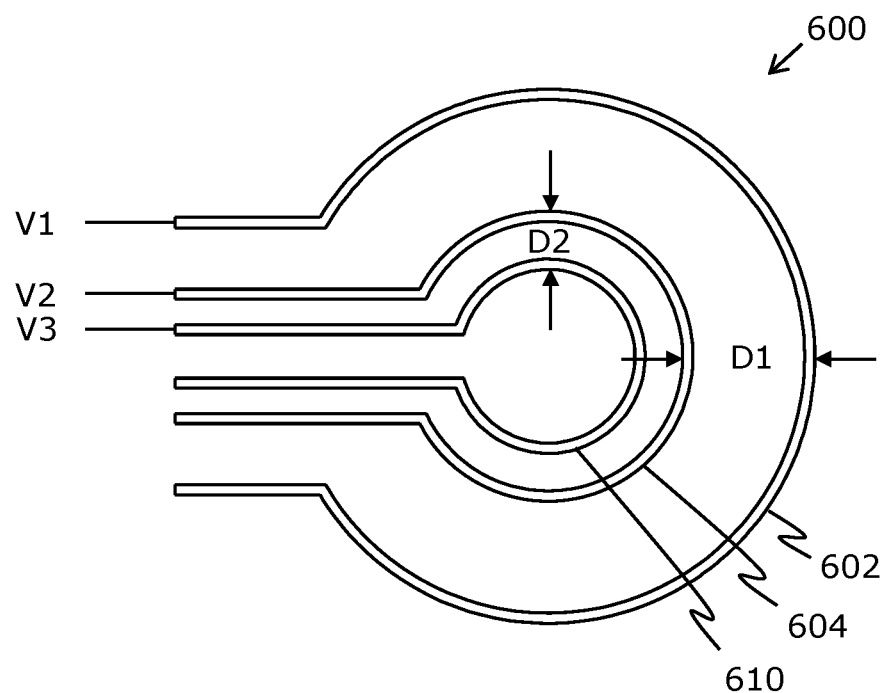

In FIG. 6C, there are shown three electrode layers (depicted as the electrode layers 602, 604, and an electrode layer 610) in the optical device 600. A spacing between the electrode layers and voltages V1, V2, V3 applied to the electrode layers vary as a function of a distance from an optical centre of the optical device 600. As shown, a spacing D1 between the electrode layers 602 and 604 is greater than a spacing D2 between the electrode layers 604 and 610. Moreover, the voltages V1, V2, V3 applied to the electrode layers 602, 604, and 610, respectively, are different.

Figure 6D:
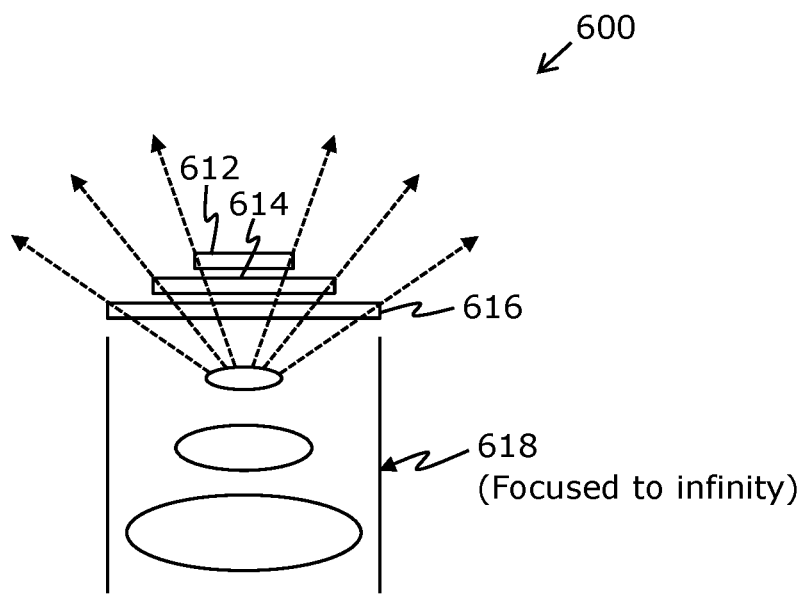
Figure 6E:
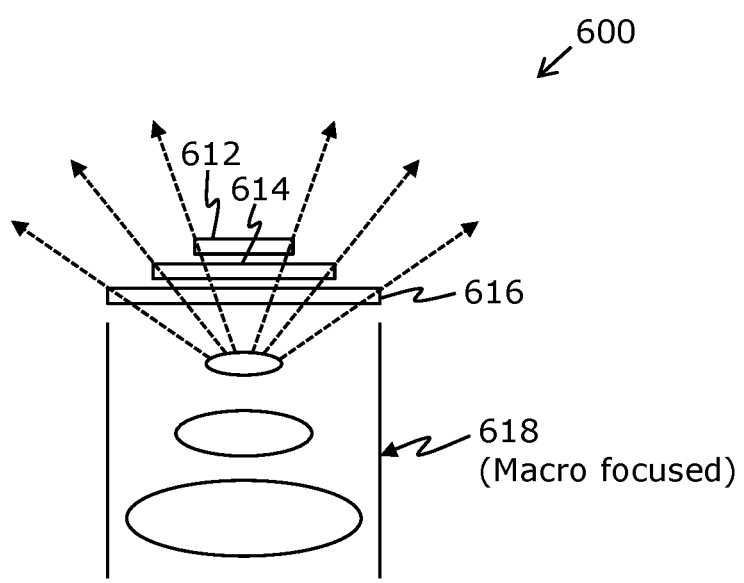

In FIGS. 6D and 6E, the optical device 600 is implemented as at least two liquid crystal lenses (depicted as liquid crystal lenses 612, 614, and 616) having different diameters. The liquid crystal lenses 612, 614, and 616 are stacked in a decreasing order of diameters. When stacking, the liquid crystal lens 616 is stacked first, followed by the liquid crystal lens 614, and finally followed by the liquid crystal lens 612. In FIG. 6D, a fixed lens 618 of an imaging apparatus (not shown) is focused to infinity, and the liquid crystal lenses 612, 614, and 616 have negative optical power (for example, −1 dioptre). In FIG. 6E, the fixed lens 618 is macro focused (i.e., focused to a macro distance), and the liquid crystal lenses 612, 614, and 616 have positive optical power (for example, +1 dioptre). The fixed lens 618 is shown, for example, as a configuration of three lenses (depicted as ellipses).

Referring to FIGS. 7A and 7B, illustrated is an implementation of an optical device 700 in different states, in accordance with another embodiment of the present disclosure. The optical device 700 comprises a polymer lens 702 and at least one micro-electro-mechanical element (depicted as a micro-electro-mechanical element 704) arranged in contact with at least one surface (depicted as a surface 706) of the polymer lens 702. The micro-electro-mechanical element 704 is controlled, based on a drive signal, to deform a shape of the surface 706. FIG. 7A depicts the optical device 700 in a first state i.e., prior to deformation of the shape of the surface 706, while FIG. 7B depicts the optical device 700 in a second state i.e., after the deformation of the shape of the surface 706.

FIGS. 7A and 7B include simplified implementations of the optical device 700 for the sake of clarity only, which should not unduly limit the scope of the claims herein. The person skilled in the art will recognize many variations, alternatives, and modifications of embodiments of the present disclosure.

Referring to FIGS. 8A, 8B, and 8C, illustrated is an implementation of an optical device 800 in various states, in accordance with yet another embodiment of the present disclosure. The optical device 800 comprises: a varifocal composite lens 802 comprising two optical elements (depicted as optical elements 804 and 806), each having a planar surface and a surface having a freeform shape, wherein planar surfaces of the two optical elements 804 and 806 are slidable over each other; and at least two actuators (depicted as actuators 808 and 810) that are to be employed to produce a relative lateral displacement between the two optical elements 804 and 806 in a direction perpendicular to an optical axis of the optical device 800, wherein the at least two actuators 808 and 810 are controlled based on a drive signal. FIG. 8A depicts the optical device 800 in a first state i.e., when the two optical elements 804 and 806 have zero relative lateral displacement, FIG. 8B depicts the optical device 800 in a second state i.e., when the optical elements 804 and 806 have a relative lateral displacement to produce a negative optical power of the optical device 800, while FIG. 8C depicts the optical device 800 in a third state i.e., when the optical elements 804 and 806 have a relative lateral displacement to produce a positive optical power of the optical device 800. In FIGS. 8B and 8C, arrows represent exemplary directions of displacement of the two optical elements 804 and 806.

FIGS. 8A, 8B and 8C include simplified implementations of the optical device 800 for the sake of clarity only, which should not unduly limit the scope of the claims herein. The person skilled in the art will recognize many variations, alternatives, and modifications of embodiments of the present disclosure.

Referring to FIG. 9, illustrated is an implementation of an optical device 900, in accordance with still another embodiment of the present disclosure. The optical device 900 comprises a liquid lens 902, wherein at least one of: a curvature, a refractive index of the liquid lens 902 is electrically controlled based on a drive signal. The liquid lens 902 contains an optical liquid material 904 therein.

FIG. 9 includes a simplified implementation of the optical device 900 for the sake of clarity only, which should not unduly limit the scope of the claims herein. The person skilled in the art will recognize many variations, alternatives, and modifications of embodiments of the present disclosure.

Figure 10:
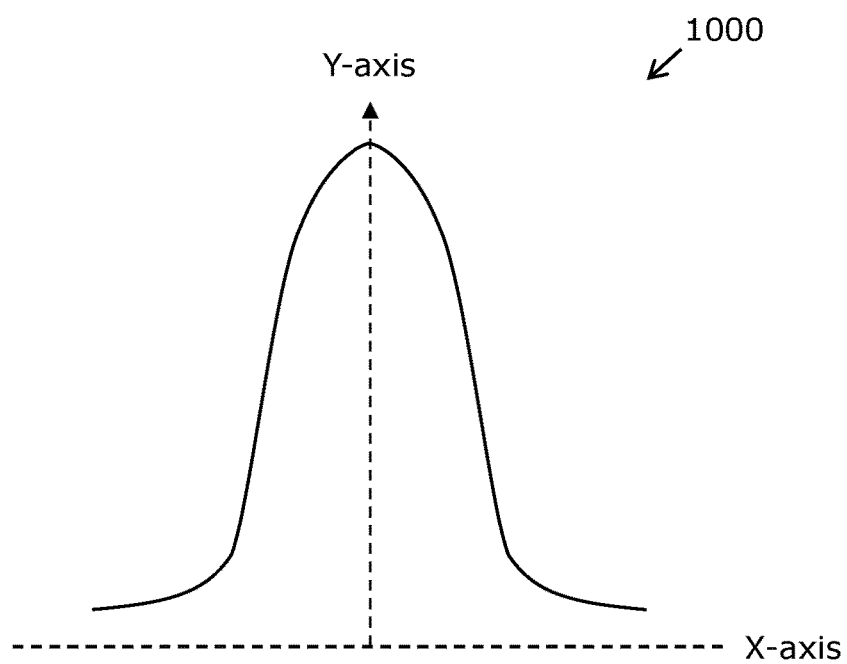
FIG. 10 illustrates an exemplary function according to which focal lengths of different portions of an optical device are adjusted, in accordance with an embodiment of the present disclosure.

Referring to FIG. 10, illustrated is an exemplary function 1000 according to which focal lengths of different portions of an optical device (not shown) are adjusted, in accordance with an embodiment of the present disclosure. Herein, X-axis represents an angular distance from an optical centre of an optical device, while Y-axis represents focal length. The function 1000 is a non-linear function, wherein the focal lengths of the different portions of the optical device decrease (non-linearly) upon an increase in angular distances of the different portions from the optical centre of the optical device.

Figure 11A:
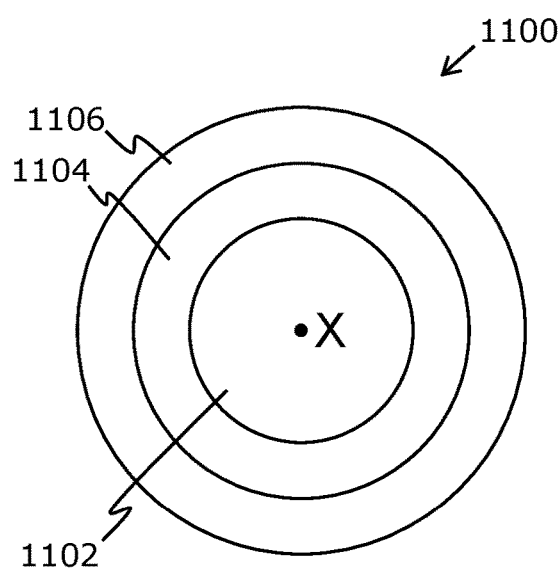
FIGS. 11A and 11B illustrate exemplary implementations of an optical device having at least two concentric portions, in accordance with different embodiments of the present disclosure.
Figure 11B:
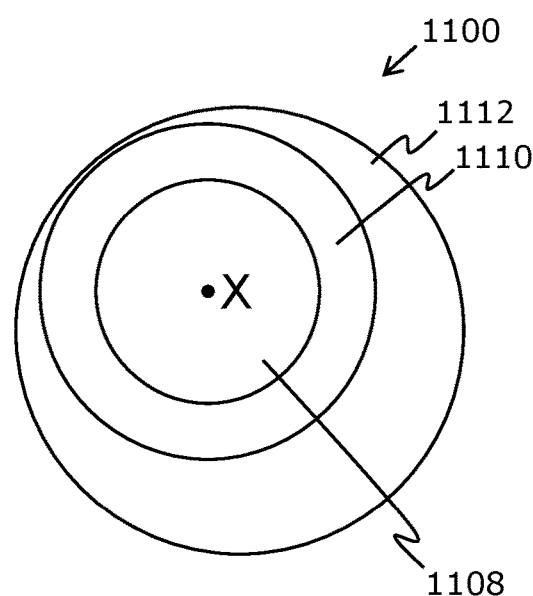

Referring to FIGS. 11A and 11B, illustrated are exemplary implementations of an optical device 1100 having at least two concentric portions, in accordance with different embodiments of the present disclosure. In FIG. 11A, the optical device 1100 is shown to have three concentric portions 1102, 1104, and 1106. These portions 1102, 1104, and 1106 form three circular controllable zones about their common centre X. The portion 1102 has a circular shape while the portions 1104 and 1106 have circular ring-like shapes. In FIG. 11B, the optical device 1100 is shown to have two concentric portions 1108 and 1110, and another portion 1112. The portions 1108 and 1110 form two circular controllable zones about their common centre X. The portion 1108 has a circular shape while the portion 1110 has a circular ring-like shape. In both FIGS. 11A and 11B, the common centre X is an optical centre of the optical device 1100.

Figure 12:
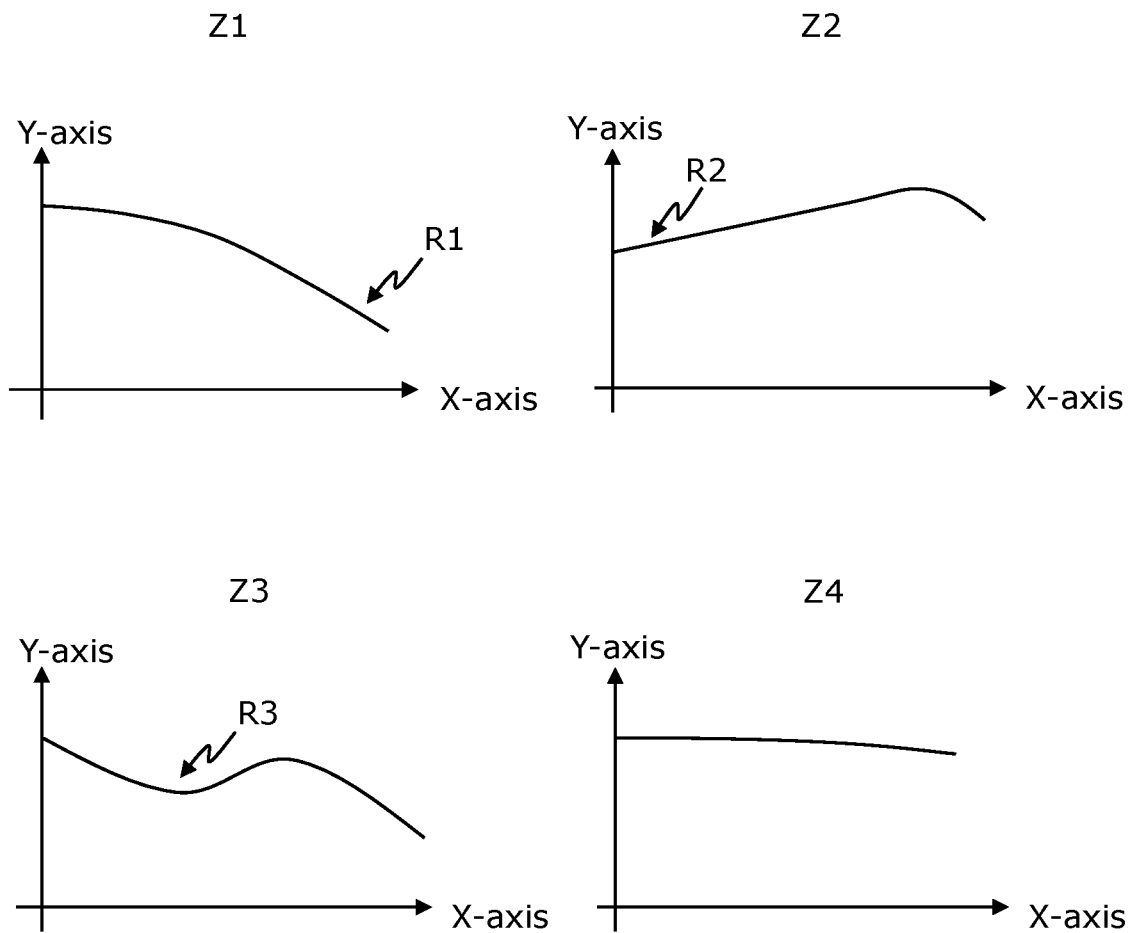
FIG. 12 illustrates three exemplary focal length adjustment scenarios of the optical device of FIG. 11A for three optical depths of focusing, and a scenario of correct focusing for a given optical depth of focusing, in accordance with an embodiment of the present disclosure.

Referring to FIG. 12, illustrated are three exemplary focal length adjustment scenarios Z1, Z2, and Z3 of the optical device 1100 of FIG. 11A for three optical depths of focusing, and a scenario Z4 of correct focusing for a given optical depth of focusing, in accordance with an embodiment of the present disclosure. In the scenarios Z1, Z2, and Z3, the optical device 1100 is focused at a distance of infinity, 50 cm, and 25 cm, respectively, in a real-world environment. Herein, X-axis represents an angular distance from the optical centre X of the optical device 1100, while Y-axis represents Modulation Transfer Function (MTF) values of the portions 1102, 1104, and 1106 of the optical device 1100. The focal lengths of the portions 1102, 1104, and 1106 are adjusted dynamically as the distance of focusing the optical device 1100 varies across the scenarios Z1, Z2, and Z3. Due to field curvature, not all points along field of view are focused on same optical depth. Thus, different types of focal length adjustment are required for each of the portions 1102, 1104, and 1106. In the scenario Z1, it is shown by region R1 of the depicted curve that the portion 1106, which corresponds to edge portions of a distorted image (not shown), has a much lesser MTF value as compared to the portions 1102 and 1104. This means that the portion 1106 is focused to an optical depth other than infinity. In the scenario Z2, it is shown by region R2 of the depicted curve that the portion 1102 has a lower MTF value as compared to the portions 1104 and 1106. This means that the portion 1102 is focused to an optical depth other than 50 cm. In the scenario Z3, it is shown by region R3 of the depicted curve that the portion 1104 has a lower MTF value as compared to the portions 1102 and 1106. This means that the portion 1104 is focused to an optical depth other than 25 cm.

In the scenarios Z1, Z2, and Z3, different focal plane adjustment is required for different portions having low MTF values. The low MTF value of a given portion shows that due to field curvature, the given portion focuses on an incorrect optical depth, and optionally an adaptive meniscus liquid crystal lens (not shown) is required to be adjusted to compensate this improper focusing and make the curve along field of view as flat as possible. In an ideal focusing scenario, all three MTF curves of scenarios Z1, Z2, and Z3 would be flat when there would not be any field curvature or when the adaptive meniscus liquid crystal lens compensates this field curvature characteristic perfectly. This ideal focusing scenario is shown as the scenario Z4, where all the portions 1102, 1104 and 1106 of the optical device 1100 are correctly focused for the given optical depth of focusing. The scenario Z4 could be achieved, for example, by use of the adaptive meniscus liquid crystal lens for requisite resulting focusing characteristics.

Figures 13A, 13B:
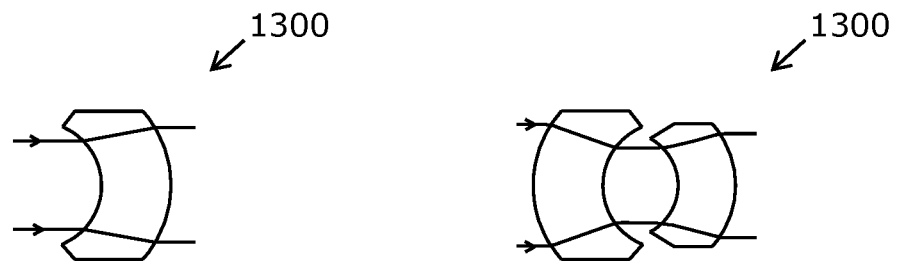
FIGS. 13A-13F illustrate exemplary implementations of a meniscus liquid crystal lens, in accordance with various embodiments of the present disclosure.
Figure 13C:
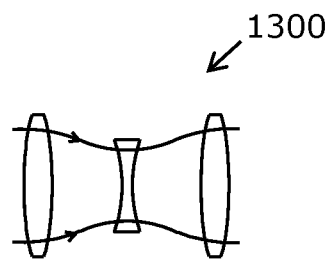
Figure 13D:
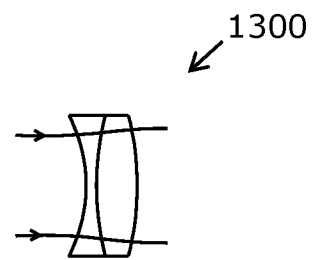
Figure 13E:
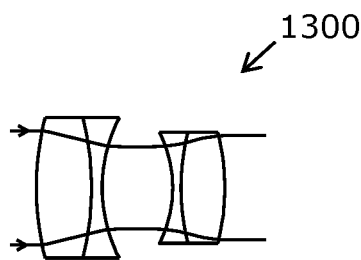
Figure 13F:
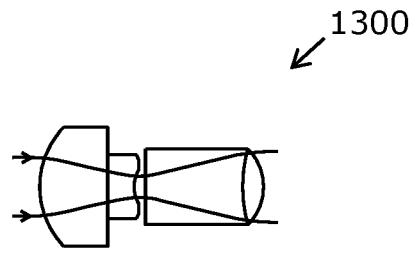

Referring to FIGS. 13A-13F, illustrated are exemplary implementations of a meniscus liquid crystal lens 1300, in accordance with various embodiments of the present disclosure. In these figures, curved lines having arrows represent light rays passing through the meniscus liquid crystal lens 1300. In FIG. 13A, the meniscus liquid crystal lens 1300 is implemented as a single meniscus lens. In FIG. 13B, the meniscus liquid crystal lens 1300 is implemented as two meniscus lenses. In FIG. 13C, the meniscus liquid crystal lens 1300 is implemented as a symmetric triplet meniscus lens. In FIG. 13D, the meniscus liquid crystal lens 1300 is implemented as an achromatized meniscus lens. In FIG. 13E, the meniscus liquid crystal lens 1300 is implemented as two achromatized meniscus lenses. In FIG. 13F, the meniscus liquid crystal lens 1300 is implemented as a modified achromatized triplet meniscus lens.

FIGS. 13A-13F include simplified implementations of the meniscus liquid crystal lens 1300 for the sake of clarity only, which should not unduly limit the scope of the claims herein. The person skilled in the art will recognize many variations, alternatives, and modifications of embodiments of the present disclosure. For example, one or more of various optical surfaces depicted in FIGS. 13A-F could be implemented by a liquid crystal lens. This would yield a hybrid arrangement of one or more liquid crystal surfaces with one or more conventional lenses.

Figure 14:
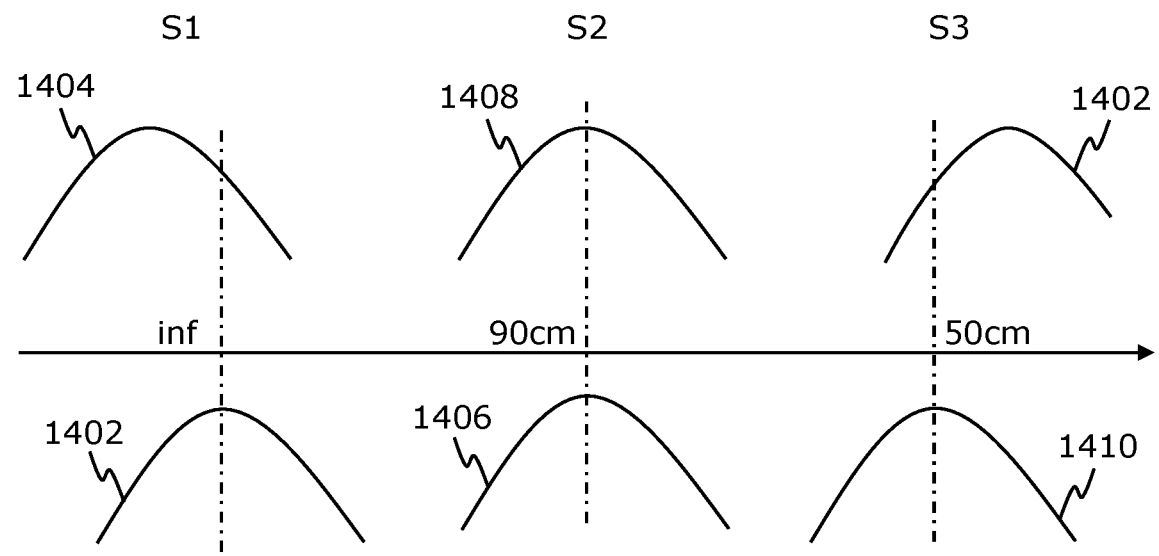
FIG. 14 illustrates three exemplary focal length adjustment scenarios of an optical device for three optical depths of focusing, in accordance with an embodiment of the present disclosure.

Referring to FIG. 14, illustrated are three exemplary focal length adjustment scenarios S1, S2, and S3 of an optical device (not shown) for three optical depths of focusing, in accordance with an embodiment of the present disclosure. The optical device is electrically controllable to have a spatially variable focal length. The optical device comprises at least a first portion and a second portion. As an example, a focal length of the first portion is 4 mm, whereas a focal length of the second portion is 2 mm. In the scenarios S1, S2, and S3, the optical device is focused at a distance of infinity, 90 cm, and 50 cm, respectively, in a real-world environment. The focal lengths of the first and second portions are adjusted dynamically as the distance of focusing the optical device varies across the scenarios S1, S2, and S3.

In the scenario S1, through focus curves 1402 and 1404 of the first portion and the second portion, respectively, indicate that a high image quality would be produced by the first portion, while a relatively lower image quality would be produced by the second portion. In the scenario S2, through focus curves 1406 and 1408 of the first portion and the second portion, respectively, indicate that a high image quality would be produced by both the first portion and the second portion. In the scenario S3, through focus curves 1410 and 1412 of the first portion and the second portion, respectively, indicate that a high image quality would be produced by the first portion, while a relatively lower image quality would be produced by the second portion.

Figure 15:
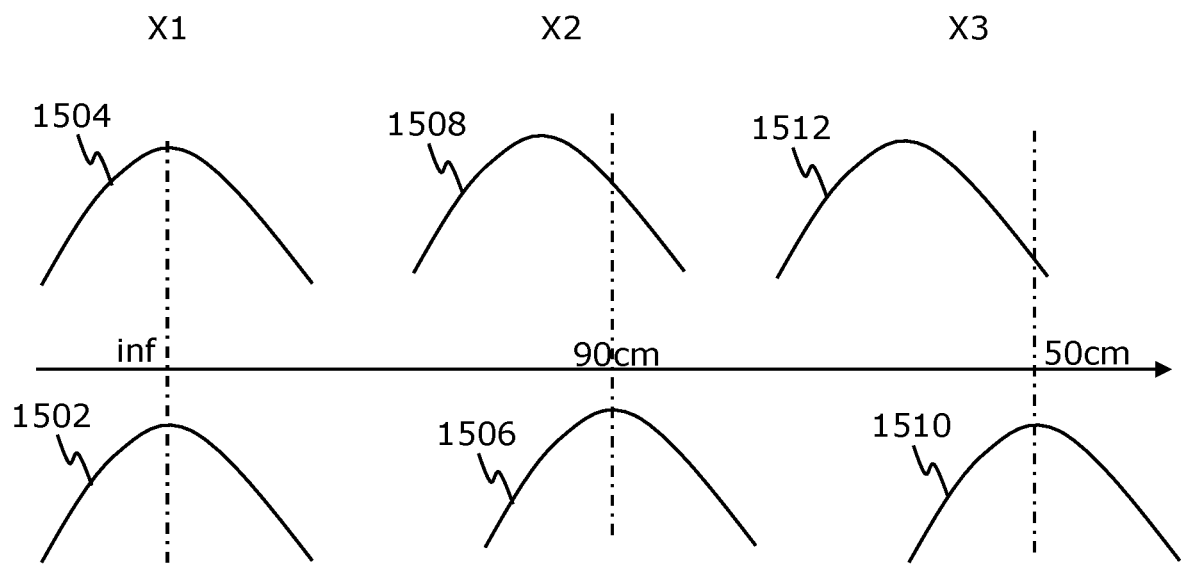
FIG. 15 illustrates three exemplary focal length adjustment scenarios of a conventional optical device for three optical depths of focusing.

Referring to FIG. 15, illustrated are three exemplary focal length adjustment scenarios X1, X2, and X3 of a conventional optical device (not shown) for three optical depths of focusing. The conventional optical device comprises at least a first conventional portion and a second conventional portion having different focal lengths, but the conventional optical device is different from an optical device (not shown) of the present disclosure. The first conventional portion may be a central portion of the conventional optical device, whereas the second conventional portion may be an edge portion of the conventional optical device. A curvature of the conventional optical device may be concave such that the edge portion is higher (i.e., more outwards), while the central portion is lower (i.e., more inwards). In the scenarios X1, X2, and X3, the conventional optical device is focused at a distance of infinity, 90 centimetres, and 50 centimetres, respectively, in a real-world environment.

In the scenario X1, through focus curves 1502 and 1504 of the first conventional portion and the second conventional portion, respectively, indicate that a high image quality would be produced by both the first conventional portion and the second conventional portion. In the scenario X2, through focus curves 1506 and 1508 of the first conventional portion and the second conventional portion, respectively, indicate that a high image quality would be produced by the first conventional portion, while a relatively lower image quality would be produced by the second conventional portion. In the scenario X3, through focus curves 1510 and 1512 of the first conventional portion and the second conventional portion, respectively, indicate that a high image quality would be produced by the first conventional portion, while a relatively much lower image quality would be produced by the second conventional portion.

Figure 16:
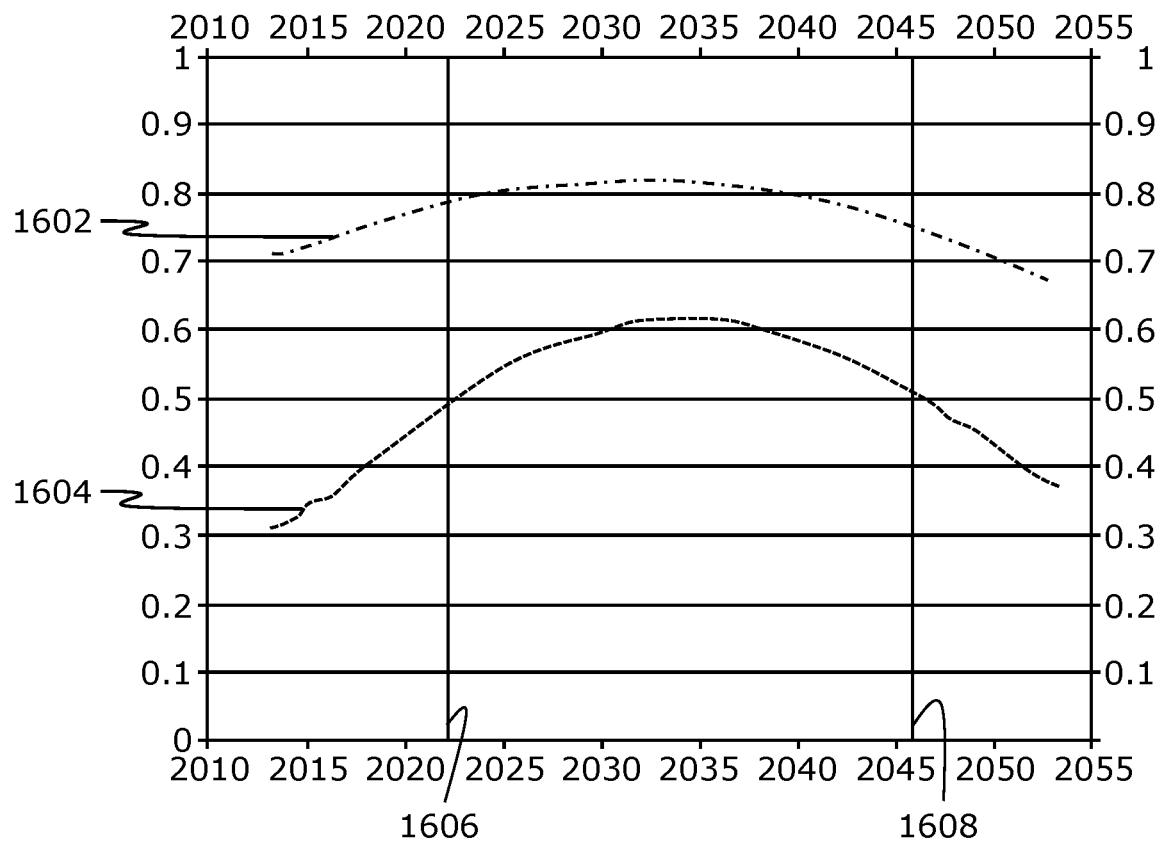
FIG. 16 illustrates exemplary through focus curves of a first portion and a second portion of an optical device, in accordance with an embodiment of the present disclosure.

Referring to FIG. 16, illustrated are exemplary through focus curves 1602 and 1604 of a first portion and a second portion, respectively, of an optical device (not shown), in accordance with an embodiment of the present disclosure. The optical device is electrically controllable to have a spatially variable focal length, such that irrespective of which distance the optical device is focused at, an entirety of a distorted image captured by the image sensor has a high image quality. Line 1606 indicates a spatial frequency when the optical device is macro focused, whereas line 1608 indicates a spatial frequency when the optical device is focused at infinity. Modulation transfer function values of the first portion and the second portion corresponding to the line 1606 are 0.79 and 0.5, respectively. Modulation transfer function values of the first portion and the second portion corresponding to the line 1608 are 0.75 and 0.51, respectively. Intermediate modulation transfer function values corresponding to intermediate lines (not shown) lying between the lines 1606 and 1608 are acceptable and indicative of the high image quality of the distorted image. Notably, for any given portion of the optical device, modulation transfer function values do not deteriorate substantially from their peak value, between the lines 1606 and 1608. As an example, peak value of modulation transfer function value for the first portion is 0.82, which deteriorates by a maximum of 8.5 percent across the lines 1606 and 1608. As another example, peak value of modulation transfer function value for the second portion is 0.62, which deteriorates by a maximum of 19.35 percent across the lines 1606 and 1608.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging apparatus comprising:
   an image sensor having a photo-sensitive surface;
   an optical device arranged on an optical path of light incidenting on the photo-sensitive surface, the optical device being electrically controllable to have a spatially variable focal length; and
   a processor configured to:
   generate and send a drive signal to the optical device to compensate for a field curvature of the optical device by adjusting focal lengths of different portions of the optical device to different extents, wherein a focal length of a first portion of the optical device is higher than a focal length of a second portion of the optical device surrounding the first portion; and
   control the image sensor to capture a distorted image of a real-world environment.

2. The imaging apparatus of claim 1, wherein the focal lengths of the different portions of the optical device are adjusted as a function of an angular distance from an optical centre of the optical device.

3. The imaging apparatus of claim 1, wherein at least two of the different portions of the optical device are concentric.

4. The imaging apparatus of claim 1, wherein an optical axis of the image sensor passes through an optical centre of the optical device, and wherein the first portion of the optical device corresponds to a first portion a field of view of the image sensor that spans between 0 degrees and an angle that lies in a range of 2-50 degrees with respect to the optical axis of the image sensor, and the second portion of the optical device corresponds to a second portion of the field of view that spans between an angle that lies in a range of 12.5-50 degrees and an angle that lies in a range of 45-110 degrees with respect to the optical axis of the image sensor.

5. The imaging apparatus of claim 1, wherein a line of vision of a user with respect to a field of view of the image sensor passes through an optical centre of the optical device, and wherein the first portion of the optical device corresponds to a first portion of the field of view of the image sensor that spans between 0 degrees and an angle that lies in a range of 2-50 degrees with respect to the line of vision, and the second portion of the optical device corresponds to a second portion of the field of view that spans between an angle that lies in a range of 12.5-50 degrees and an angle that lies in a range of 45-110 degrees with respect to the line of vision.

6. The imaging apparatus of claim 5, wherein the processor is configured to:
   receive, from a display apparatus, information indicative of a gaze direction of a user; and
   determine, based on the gaze direction, the line of vision of the user with respect to the field of view of the image sensor.

7. The imaging apparatus of claim 1,
   wherein the optical device comprises:
   at least two electrode layers;
   a liquid crystal substance disposed between the at least two electrode layers; and
   a control circuit, coupled to the at least two electrode layers, to be employed to orient molecules of the liquid crystal substance in a given portion of the optical device in a given direction, based on the drive signal.

8. The imaging apparatus of claim 7, wherein at least one of: a thickness, a concentration of the liquid crystal substance between the at least two electrode layers maximum at an optical centre of the optical device and decreases as a function of a distance from the optical centre.

9. The imaging apparatus of claim 7, wherein at least one of: a spacing between the at least two electrode layers, voltages applied to the at least two electrode layers vary as a function of a distance from an optical centre of the optical device.

10. The imaging apparatus of claim 7, wherein the optical device is implemented as at least two liquid crystal lenses having different diameters, wherein the at least two liquid crystal lenses are stacked in a decreasing order of diameters.

11. The imaging apparatus of claim 6, wherein the optical device comprises:
    a polymer lens; and
    at least one micro-electro-mechanical element arranged in contact with at least one surface of the polymer lens, wherein the at least one micro-electro-mechanical element is controlled, based on the drive signal, to deform the shape of the at least one surface.

12. The imaging apparatus of claim 6, wherein the optical device comprises:
    a varifocal composite lens comprising two optical elements, each having a planar surface and a surface having a freeform shape, wherein planar surfaces of the two optical elements are slidable over each other; and
    at least two actuators that are to be employed to produce a relative lateral displacement between the two optical elements in a direction perpendicular to an optical axis of the optical device, wherein the at least two actuators are controlled based on the drive signal.

13. The imaging apparatus of claim 1, wherein the optical device comprises a liquid lens, wherein at least one of: a curvature, a refractive index of the liquid lens is electrically controlled based on the drive signal.

14. The imaging apparatus of claim 1, wherein at least one of: rotation, tilt, shift of the optical device is controlled based on the drive signal.

15. The imaging apparatus of claim 1, wherein the processor is configured to:
    receive, from a display apparatus, information indicative of gaze directions of a user;
    determine a gaze point in the real-world environment, based on a convergence of the gaze directions; and
    generate the drive signal based on an optical depth of the gaze point in the real-world environment.

16. The imaging apparatus of claim 1, wherein the processor is configured to generate the drive signal based on at least one of: a depth map, a contrast analysis of the real-world environment.

17. The imaging apparatus of claim 1, further comprising a meniscus liquid crystal lens, wherein the processor is configured to control the meniscus liquid crystal lens to compensate for the field curvature of the optical device.

18. An optical device comprising:
    at least two electrode layers;
    a liquid crystal substance disposed between the at least two electrode layers; and
    a control circuit, coupled to the at least two electrode layers, to be employed to orient molecules of the liquid crystal substance in a given portion of the optical device in a given direction, wherein the control circuit is to be driven to adjust focal lengths of different portions of the optical device to different extents to compensate for a field curvature of the optical device, wherein a focal length of a first portion of the optical device is higher than a focal length of a second portion of the optical device surrounding the first portion.

19. The optical device of claim 18, wherein the focal lengths of the different portions of the optical device are adjusted as a function of an angular distance from an optical centre of the optical device.

20. The optical device of claim 18, wherein at least two of the different portions of the optical device are concentric.

21. The optical device of claim 18, wherein at least one of: a thickness, a concentration of the liquid crystal substance disposed between the at least two electrode layers is maximum at an optical centre of the optical device and decreases as a function of a distance from the optical centre.

22. The optical device of claim 18, wherein at least one of: a spacing between the at least two electrode layers voltages applied to the at least two electrode layers vary as a function of a distance from an optical centre of the optical device.

23. The optical device claim 18, wherein the optical device is implemented as at least two liquid crystal lenses having different diameters, wherein the at least two liquid crystal lenses are stacked in a decreasing order of diameters.

* * * * *